United States Patent
Burke

(10) Patent No.: US 10,977,431 B1
(45) Date of Patent: Apr. 13, 2021

(54) AUTOMATED PERSONALIZED ZASSHI

(71) Applicant: Amazon Technologies, Inc., Seattle, WA (US)

(72) Inventor: John Burke, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/565,231

(22) Filed: Sep. 9, 2019

(51) Int. Cl.
*G06F 17/00* (2019.01)
*G06F 40/166* (2020.01)
*H04L 29/08* (2006.01)

(52) U.S. Cl.
CPC ............ *G06F 40/166* (2020.01); *H04L 67/06* (2013.01)

(58) Field of Classification Search
CPC ............................... G06F 40/166; H04L 67/06
See application file for complete search history.

(56) References Cited

U.S. PATENT DOCUMENTS

| | | | | |
|---|---|---|---|---|
| 8,958,662 B1* | 2/2015 | Grosz | ................ | H04N 21/854 382/305 |
| 8,990,235 B2* | 3/2015 | King | ................ | G06F 40/197 707/759 |
| 9,632,985 B1* | 4/2017 | MacInnis | ................ | G06F 40/106 |
| 10,216,989 B1* | 2/2019 | Ramos | ................ | G06K 9/03 |
| 10,789,284 B2* | 9/2020 | Kennedy | ................ | G06F 16/55 |
| 2007/0011607 A1* | 1/2007 | Lazareck | ................ | G06F 40/186 715/201 |
| 2007/0256011 A1* | 11/2007 | Jones | ................ | G06F 40/186 |
| 2008/0270889 A1* | 10/2008 | Slosar | ................ | G06F 40/186 715/235 |
| 2009/0172022 A1* | 7/2009 | Bathiche | ................ | G06F 40/151 |
| 2011/0234613 A1* | 9/2011 | Hanson | ................ | G06F 16/58 345/589 |
| 2012/0154608 A1* | 6/2012 | Ko | ................ | G11B 27/34 348/207.11 |
| 2014/0088750 A1* | 3/2014 | Sharma | ................ | H04N 1/387 700/118 |
| 2014/0115451 A1* | 4/2014 | Sheldon-Dante | ..... | G06F 40/166 715/255 |
| 2014/0280402 A1* | 9/2014 | Tomich | ................ | G06F 16/16 707/827 |
| 2015/0082155 A1* | 3/2015 | Roh | ................ | G06Q 50/01 715/254 |

(Continued)

*Primary Examiner* — Laurie A Ries
(74) *Attorney, Agent, or Firm* — Eversheds Sutherland (US) LLP

(57) ABSTRACT

Devices, systems, and methods are provided for automated personalized Zasshi. The system may generate a computer-executable file including first content associated with a first book, and second content associated with a second book, the first content including first image data and first text data, and the second content including second image data and second text data. The system may determine a selectable action associated with the first content or the second content, and may determine metadata associated with the first content, the second content, and the selectable action. The system may transmit the computer-executable file and may receive selection data associated with the selectable action. The system may determine, based on the metadata, that the selectable action is associated with the first content. The system may determine, based on the selectable action, third content.

20 Claims, 9 Drawing Sheets

(56) References Cited

U.S. PATENT DOCUMENTS

| | | | |
|---|---|---|---|
| 2015/0143209 A1* | 5/2015 | Sudai | G06F 40/186 |
| | | | 715/202 |
| 2016/0011736 A1* | 1/2016 | Hong | G06F 16/58 |
| | | | 715/731 |
| 2016/0171014 A1* | 6/2016 | Lam | G06F 16/58 |
| | | | 707/722 |
| 2016/0306785 A1* | 10/2016 | Sebastian | A63F 13/655 |
| 2016/0342690 A1* | 11/2016 | Young | G09B 5/06 |
| 2017/0083196 A1* | 3/2017 | Hartrell | G06N 3/0454 |
| 2018/0322103 A1* | 11/2018 | Yeo | G06F 40/279 |
| 2019/0318003 A1* | 10/2019 | Kennedy | G06F 16/285 |
| 2020/0110772 A1* | 4/2020 | Pigulea | G06F 9/451 |
| 2020/0150832 A1* | 5/2020 | Winn | G06F 3/0482 |

\* cited by examiner

AUTOMATED PERSONALIZED ZASSHI

BACKGROUND

Comic books and graphic novels have become increasingly popular. For example, Manga comic books and graphic novels may include panels with illustrations and text which represent a story that progresses as a reader views the panels sequentially. However, the price of Manga may be prohibitive to some readers, particularly when readers prefer to read different stories from multiple content publishers. While Manga Zasshi provides multiple Manga stories in an issue, readers may prefer to read only one comic or graphic novel series in a Manga Zasshi, and when reader purchases a Manga Zasshi, the reader may not be able to determine which stories are included, and content publishers may not be able to determine which stories the reader actually read.

Figure 1:
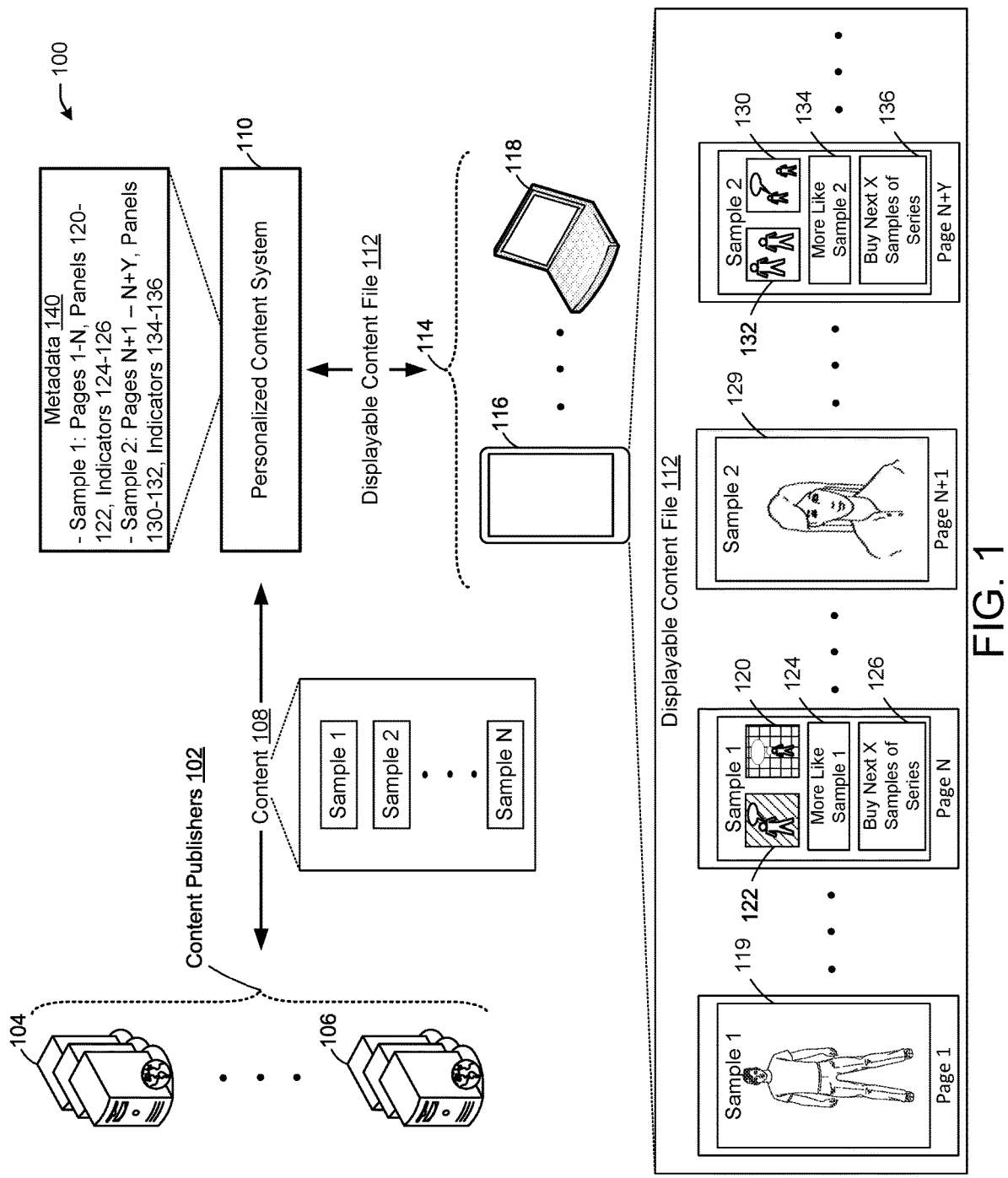
FIG. 1 illustrates an example system for automated personalized Zasshi, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for automated personalized Zasshi.

Manga is an increasingly popular form of comic books and graphic novels. The traditional format for Manga presents a collection of drawing panels (e.g., cover illustrations, and individual panel illustrations for the story). A reader is intended to follow an illustrated Manga story by progressing through panels. Some publications, such as Zasshi (e.g. a magazine), aggregate multiple Manga stories (e.g., stories from multiple comics and/or graphic novels) into an issue. For example, Manga Zasshi (also referred to as manga-shi) may refer to a magazine available for purchase and which includes panels from multiple comic book and graphic novel stories. An issue of Manga Zasshi may include hundreds of pages with comic and/or graphic novel panels from multiple stories. However, Manga Zasshi may be published by a single publisher which prints the comics and graphic novels of the publisher. Therefore, a reader who prefers to read comics and/or graphic novels may have to purchase hundreds of pages to read just one of their preferred comics or graphic novels rather than purchasing a Manga Zasshi that is customized to include the reader's preferred content. Manga Zasshi readers also may be limited to stories published by one publisher rather than being able to read a Manga Zasshi with preferred stories from multiple publishers. Readers also may not be aware of which stories are in a Manga Zasshi, and therefore may purchase a Manga Zasshi only to find that their preferred stories are not included.

Manga Zasshi publishers may select content to present in an issue of Manga Zasshi based on which comic books and/or graphic novels are the most popular. However, Manga Zasshi customized for a specific reader based on the reader's preferences do not exist. Publishers also may not be able to determine which stories were read in an issue of Manga Zasshi, particularly when the Manga Zasshi is purchased in a hard copy format. Therefore, manga publishers and publishers of other types of content (e.g., electronic magazines, electronic books, etc.) may benefit from an improved method of determining which stories a reader read and enjoyed in a Manga Zasshi (or other content) that aggregates multiple stories.

Therefore, both Manga readers and Manga publishers may benefit from an automated, personalized, and digital Zasshi that includes stories from multiple publishers.

In one or more embodiments, a device may receive and render content from multiple publishers. For example, an electronic reader (e.g., e-reader) device, tablet, smartphone, or other electronic device may present multiple volumes of comic book and/or graphic novel content from a single computer-readable file as Manga Zasshi. The content may include multiple portions of content from multiple series offered by multiple content publishers.

In one or more embodiments, samples of aggregated content may be selected for a particular user. In this manner, one user device for a first user may receive a Manga Zasshi issue with different samples of content (e.g., different stories from different comic books and/or graphic novels) than another user device may receive for a second user. Content selection criteria may include a number of people who read a sample and then bought the corresponding comic book or graphic novel chapter, episode, or volume, a user's or user device's browsing or page history (e.g., including an analysis of which chapter, episode, or volumes were browsed, but not purchased, by the user), series logic (e.g., if the user read and/or bought part one of a series with multiple parts, the user may be interested in other parts of the same series), a determination of which content was read and/or bought by customers who read and/or bought the same content as a given user, user actions (e.g., whether the user opened the file for given content, whether the user performed an end action, such as providing a product review, selecting an indicator (e.g., a selectable action) indicating that the user read and/or enjoyed the content, etc.), and other criteria. A user may opt into a series, and when new content for the series is available, the user's device may download the content and/or a system may generate an email or other type of message with a link to the newly available content.

In one or more embodiments, to determine which content in a file with aggregated content from multiple stories was read by a user, a system may consider metrics based on user activity with a device. For example, the system may determine whether a user clicked on a link in a table of contents, the link referring to a particular story (e.g., indicating that the user wanted to read the story). The content may have end actions, such as selectable indicators (e.g., "more like this," "less like this," "purchase," "add to cart," etc.) that, when selected, result in communication of selection data indicating that the selectable indicator (or selectable action) was selected, a location (e.g., a page of a book presented by a content file) where a selectable action was presented, a metric indicating a selectable action such as an indication that the user enjoyed the content, did not enjoy the content, purchased the content, etc. When content is read using a web browser, the individual stories may be individual files. Thus, when a user reads one story, a device may determine that the specific file for the story was executed. A system may determine which files were executed by a user, and may determine whether the files are related to a particular publisher, series, or other similar content (e.g., based on metadata for the files indicating content categories, target readers, which content that other readers of the file read, the location of content samples in a content file, the location of a selectable action in a content file, etc.).

In one or more embodiments, a system may receive content from multiple publishers and may stitch together the content in a single file for a user. The system may map each portion of content (e.g., each comic book and/or graphic novel story) to a larger content unit (e.g., the specific story, author, publisher, etc.) and to a metric after a panel or digital page on which the portion of content is presented. For example, content from one comic book or graphic novel may occupy the first five pages of readable content on a device. After the final panel for the comic book, a selectable indicator may be presented, allowing the user to indicate whether the user wants more or less of the content from the same story, series, publisher, author, etc.

In one or more embodiments, the system may map the specific panels and/or pages (or other indexed locations) of content for a story to the larger story, to a series, to an author and/or publisher, and the like so that the system may determine whether the user read and enjoyed the specific story, series, publisher, author, etc. for the purposes of customizing the next issue of aggregated content for the user. In particular, a Manga Zasshi may include a file with panels from multiple comic books and/or graphic novels, and the file may have metadata indicating which panels and/or digital pages correspond to a story, series, author, publisher, and the like. In this manner, a system may monitor a reader's interaction with individual content samples in a file which includes multiple content samples from different sources. When a user selects a "more like this" end action indicator, the system may trigger an action to identify content having the same or similar category (e.g., action, adventure, comedy, romance, etc.), the same or similar target reader demographics, the same or similar series, the same author and/or publisher, or other criteria as the content sample that was read. For example, when the user reads volume I of Series X and selects "more like this," the system may identify from the metadata that the selection of the "more like this" indicator refers to the reader preferring more content from Series X, more content from other series similar to Series X, and the like.

In one or more embodiments, the system may use machine learning to identify content of interest for a user. The machine learning may be trained with data such as popular content for all users, popular content for respective user demographics, signals generated from end actions (e.g., selections of "more like this," "less like this," "buy the next X portions of this series," etc.). The criteria used to determine similar content that a user may enjoy based on previously read content and user actions may be adjusted using machine learning so that the most relevant content for a user is presented in a Zasshi or other aggregated content.

In one or more embodiments, aggregated content may be personalized using P13N personalization. P13N personalization may replace or supplement a "recommended for you" category or other similar category presented on a device application or interface. The signals generated based on user actions (e.g., indications that a user read a portion of content, has indicated a preference for more of the same content, has purchased the content, etc.) may be P13N signals that provide indications of a user's content preferences. A system may map the signals to related content to be evaluated for inclusion in a subsequent file with aggregated portions of content from different comic book and/or graphic novel stories.

In one or more embodiments, readers may discover new content, including content the reader may not have known existed and/or which predates any content they have read, based on the analysis of P13N personalization of content (e.g., "Personalization" where the "13" represents customizable content of the thirteen letters between the "P" and the "N"). P13N personalization and customized end actions (e.g., "buy the next X amount in this series") for multiple portions of aggregated content may allow for improved discovery and purchasing of content, and may allow for content publishers to increase readership due to more customized content selection and delivery. The content selected for content files may include samples from book (e.g., comic books, graphic novels, articles, magazines, etc.). The samples may include an entire book, such as an issue/story of a comic book, or a subset of the content of an entire book, such as some panels of a comic book. The specific panels selected, for example, may be based on a content personalization process, based on metrics indicating popular content, content that was purchased after being viewed, content similar to what a reader or similar readers have read, the selection of end actions (e.g., selectable actions) and the like.

In one or more embodiments, a content personalization system may generate presentable content files that include content from multiple sources (e.g., different content publishers). The content may include multiple comic book and/or graphic novel stories (e.g., chapters, episodes, or volumes from different content series). A story may include a combination of images and text, which may be stored on one or more files. To generate a presentable content file with multiple aggregated stories, the content personalization system may combine data from story files into one file, and may add content such as selectable indicators. For example, the content personalization system may add selectable graphics, icons, buttons, or other items/objects that, when selected by a reader, indicate a preference for or against the content in the presentable content file. The selectable content may be in the form of selectable indicators of a user's preference, such as a selectable button or icon that is displayed with a graphic and/or text reading "Subscribe to this series," "Subscribe to this Publisher," "More Content like this," "Less Content like this," "Buy the next X Volumes of this Story," and the like. The content personalization system may receive reader selections of the selectable indicators. To determine the content to which a selectable indicator corresponds (e.g., which content of the multiple stories the user requested more or less of), the content personalization system may maintain metadata or other data for respective presentable content files. For example, the metadata may indicate which stories are presented on which digital pages of a presentable content file, which panels (e.g., images) are presented on which digital pages of the presentable content file, which selectable indicators are presented on which digital pages (and at which locations) of a presentable content file, and the like. In this manner, when the content personalization system receives selections of selectable indicators from a device, the content personalization system may identify the specific presentable content file, which selectable indicator was selected, and to which story or series the selectable indicator corresponds. Using the selections, the content personalization system may determine user preferences for or against certain content, and may use those preferences to identify content to include or not include in subsequent presentable content files for user or device.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for automated personalized Zasshi, in accordance with one or more example embodiments of the present disclosure.

Referring to FIG. 1, the system 100 may include one or more content publisher systems 102 (e.g., publisher system 104, publisher system 106), which may send content 108 (e.g., sample 1, sample 2, . . . , sample N, which may represent files of comic book or graphic novel content, including images, text, and metadata) to a personalized content system 110 (e.g., remote from the content publisher systems 102). The personalized content system 110 may use the content 108 to generate a displayable content file 112, which may aggregate multiple sample files (e.g., in their entirety or portions, such as panels with images and/or text) of the content 108 into the displayable content file 112. The personalized content system 110 may send the displayable content file 112 to one or more user devices 114 (e.g., user device 116, user device 118). The displayable content file 112 may be computer-executable, so when the one or more user devices 114 execute the displayable content file 112, the samples of the displayable content file 112 may be presented on digital pages like a book or magazine.

Still referring to FIG. 1, the displayable content file 112 may include samples from the content 108 (e.g., sample 1, sample 2) and one or more selectable indicators as described further below. While sample 1 from the content 108 as shown may be presented on page 1 of the displayable content file 112, sample 1 may be presented on any other page of the displayable content file 112. Sample 1 of the displayable content file 112 may be displayed on a page with a cover image 119, which may be unique to a comic book or graphic novel series, volume, or issue. Sample 1 may include multiple panels, such as panel 120 and panel 122 (e.g., which may be part of all of the content in a story, such as a comic book issue, or may be a subset of panels from a story selected based on user preferences and other metrics). After the panels of sample 1, or included on any page with panels of sample 1 (e.g., on page 1-page N), selectable indicators (selectable actions) of user preferences for story 1 may be presented in the displayable content file 112 or in addition to the content of the displayable content file 112. For example, a selectable indicator 124 presented during or after sample 1 may display a text or graphic such as "More like Sample 1." Selectable indicator 126 may be presented during or after sample 1 may display a text or graphic such as "Buy Next X Samples of Sample 1 Series." The personalized content system 110 may add the selectable indicator 124 and the selectable indicator 126 (e.g., selectable actions) to the displayable content file 112 (e.g., in the form of computer-executable code, scripts, etc., which, when the displayable content file 112 is executed, causes display of the selectable indicator 124 and the selectable indicator 126) along with the content from sample 1. When a reader of the displayable content file 112 selects (e.g., taps, touches, clicks, etc.) the selectable indicator 124 and/or the selectable indicator 126, the user device 116 may send an indication of the selection(s), such as in the form of selection data (e.g., action identifiers, locations such as digital pages for the selectable indicators, which sample is being presented, which one or more panels are being presented, etc.). To determine which selectable indicator corresponds to which sample or panel(s), and to determine a reader preference based on which selectable indicator was selected, the personalized content system 110 may rely on metadata 140 as described further below.

Still referring to FIG. 1, the displayable content file 112 may include sample 2 of the content 108 on any page of the displayable content file 112 (e.g., from pages N+1 to page N+Y as shown). Sample 2 of the content 108 may begin with a cover image 129, and may include panels such as panel 130 and panel 132. The personalized content system 110, when generating the displayable content file 112, may add selectable indicators to the displayable content file 112 to correspond to sample 2. For example, a selectable indicator 134 presented during or after sample 2 may display a text or graphic such as "More like Sample 2." Selectable indicator 136 may be presented during or after sample 2 may display a text or graphic such as "Buy Next X Samples of Sample 2 Series." When a reader of the displayable content file 112 selects (e.g., taps, touches, clicks, etc.) the selectable indicator 134 and/or the selectable indicator 136, the user device 116 may send an indication of the selection(s). To determine which selectable indicator corresponds to which sample, and to determine a reader preference based on which selectable indicator was selected, the personalized content system 110 may rely on metadata 140 corresponding to the displayable content file 112.

To determine which content (e.g., which samples) were viewed/read in the displayable content file 112, the personalized content system 110 may generate metadata 140 for the displayable content file 112. The metadata 140 may indicate on which digital pages a sample, panel, or selectable indicator is presented. For example, for the displayable content file 112, the metadata 140 may indicate that sample 1 is presented on pages 1-N and includes the cover image 119, panel 120, and panel 122, and is associated with the indicator 124 and the indicator 126 on page N. The metadata 140 may indicate that sample 2 is presented on pages N+1-N+Y and includes the cover image 129, panel 130, and panel 132, and is associated with the indicator 134 and the indicator 136 on page N+Y. When the personalized content system 110 receives reader selections of selectable indicators from the one or more user devices 114, the personalized content system 110 may match the selectable indicators to samples and/or digital pages of the displayable content file 112 using the metadata 140. For example, the personalized content system 110 may receive from the user device 116 an indication of a selection of the selectable indicator 124 for the displayable content file 112. The personalized content system 110 may determine, from the metadata 140, that the selectable indicator 124 corresponds to sample 1 or a particular one or more panels of sample 1 of the displayable content file 112, and that the indicator 124 corresponds to a user preference for more content like sample 1 or the one or more panels (e.g., similar content, such as artwork, image objects, thought bubbles, speech/conversation, content types/genres, actions, scenes, and the like based on an analysis of image and/or text data from one or more panels, including image tags or other indicators, keywords or phrases from text data in one or more panels, person and/or object detection using image data, etc.).

In one or more embodiments, the personalized content system 110 may determine which of the content 108 (e.g., in entirety or in portions, such as a subset of panels in a comic book) to use when generating the displayable content file 112 based on a variety of criteria. The personalized content system 110 may track how often content is read (e.g., individual stories, volumes, series, etc.) by all readers or groups of readers (e.g., based on location, demographics, etc.), how often a sample (e.g., all or a portion of a story) is included in a displayable content file such as a Manga, how often people "convert" (e.g., purchases content) after reading a sample (e.g., how often a reader of a story selects a selectable indicator that indicates a request for a subscription to the story/series, a preference for more content of the story/series/sample, and the like). The one or more user devices 114 may provide, with user consent, browsing history to the personalized content system 110, and the personalized content system 110 may determine which story/series/sample titles, content categories, and the like that a user or device browsed (e.g., based on webpage or other product page cookies or activity logs, etc.), and which stories/series/samples a user or device viewed and bought or subscribed to compared to which stories/series/samples a user or device viewed without purchasing or subscribing.

In one or more embodiments, the personalized content system 110 may use "series logic" to identify stories that are part of a series. For example, the personalized content system 110 may determine that a reader has read one story/sample of a series (e.g., story 1 of a series with multiple stories), as the personalized content system 110 may receive selections of selectable indicators and/or may receive data from the one or more user devices 114 indicative that a reader has browsed story 1, read story 1, purchased story 1, and the like, and the personalized content system 110 may use series logic to determine that the reader has a preference for other stories/samples of the same series. The personalized content system 110 may include one or more subsequent stories in a series in one or more subsequent displayable content files. The personalized content system 110 may use browsing and/or purchase history to determine other series that a reader may be interested in given a reader's interest in a series. For example, the personalized content system 110 may determine that readers of series X may have purchased or subscribed to series Y, so when a reader indicates a preference for series X (e.g., from having read series X or providing a selection of a selectable indicator indicating a preference for more content similar to or included in series X), the personalized content system 110 may determine that series X readers have also indicated a preference for series Y, and may provide stories (e.g., samples) of series Y in one or more subsequent displayable content files for a reader.

In one or more embodiments, to determine that a reader has read a story or sample, the personalized content system 110 may receive data from the one or more user devices 114 indicating that a reader has opened a displayable content file (e.g., the displayable content file 112), that the one or more user devices 114 have rendered a digital page of a displayable content file, and/or that a reader has selected a selectable indicator of a displayable content file. Readers may be presented with options to write a product review and/or to recommend a sample, story, series, author, publisher, and the like to another reader. The personalized content system 110 may receive data from the one or more user devices 114 or from other devices that a reader has provided a product review or recommendation of content, and may determine a user preference for the content.

In one or more embodiments, the personalized content system 110 may use tags, metadata, and/or other types of data for samples, stories, series, publishers, authors, and the like to identify similar content. The tags, metadata, and/or other types of data may correspond to an individual panel having image and/or text data, or to multiple panels, either a subset of the panels of a sample or all of the panels of a sample. For example, the metadata 140 for a story may include tags or other identifiers for the panel(s), sample, story, a series that includes the story, an author of the story, a publisher of the story, and one or more product categories or genres. When the personalized content system 110 identifies a reader preference for any content, the personalized content system 110 may use the tags or other identifiers to locate or request content (e.g., from the content publisher systems 102) having one or more of the same tags and/or identifiers. The tags or other identifiers may indicate the content being shown with image and/or text data, such as whether artwork is shown, what type or genre of artwork, whether text is shown, whether dialog is shown, whether characters are performing any particular actions, whether a panel or group of panels exhibits any actions, subjects, or characteristics, any of which may be used to compare to available content (e.g., in a content catalog) to identify other panels, samples, stories, and the like sharing the same or similar features.

In one or more embodiments, a selectable indicator may allow users to opt into or follow a series, author, publisher, content type or genre, and the like. The personalized content system 110 may receive a selection of one or more selectable indicators and identify content from a respective series, author, publisher, content type or genre, and may request the content or listen to content streams (e.g., provided by the content publisher systems 102 or other systems) for content having the respective series, author, publisher, content type or genre. The personalized content system 110 may generate e-mails or other messages that notify readers of the one or more user devices 114 that preferred content has become available, and/or that other relevant content may be recommended to the reader based on selected preferences and/or analysis of what the reader has read, subscribed to, and/or purchased. For example, an e-mail or other message may include a link that, when selected on the one or more user devices 114, may cause the rendering of the displayable content file 112 in an application (e.g., a web browser or mobile application page) executing on the one or more user devices 114.

In one or more embodiments, the displayable content file 112 may be displayable to the one or more user devices 114 when executed using an application, such as a mobile application, web browser, or other application. For example, an electronic reader application, library application, content viewer application, or other type of device application may execute the displayable content file 112 to present the content (e.g., the stories). The one or more user devices 114 may access one or more web pages where, upon selection of a link or other object, the displayable content file 112 may be loaded for presentation using the web browser.

In one or more embodiments, the content publisher systems 102, the personalized content system 110, and/or the one or more user devices 114 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The personalized content system 110 may be included in a remote network (e.g., a cloud-based computer network of one or more physical or virtual computers), and may be accessible by the one or more user devices 114.

Figure 2:
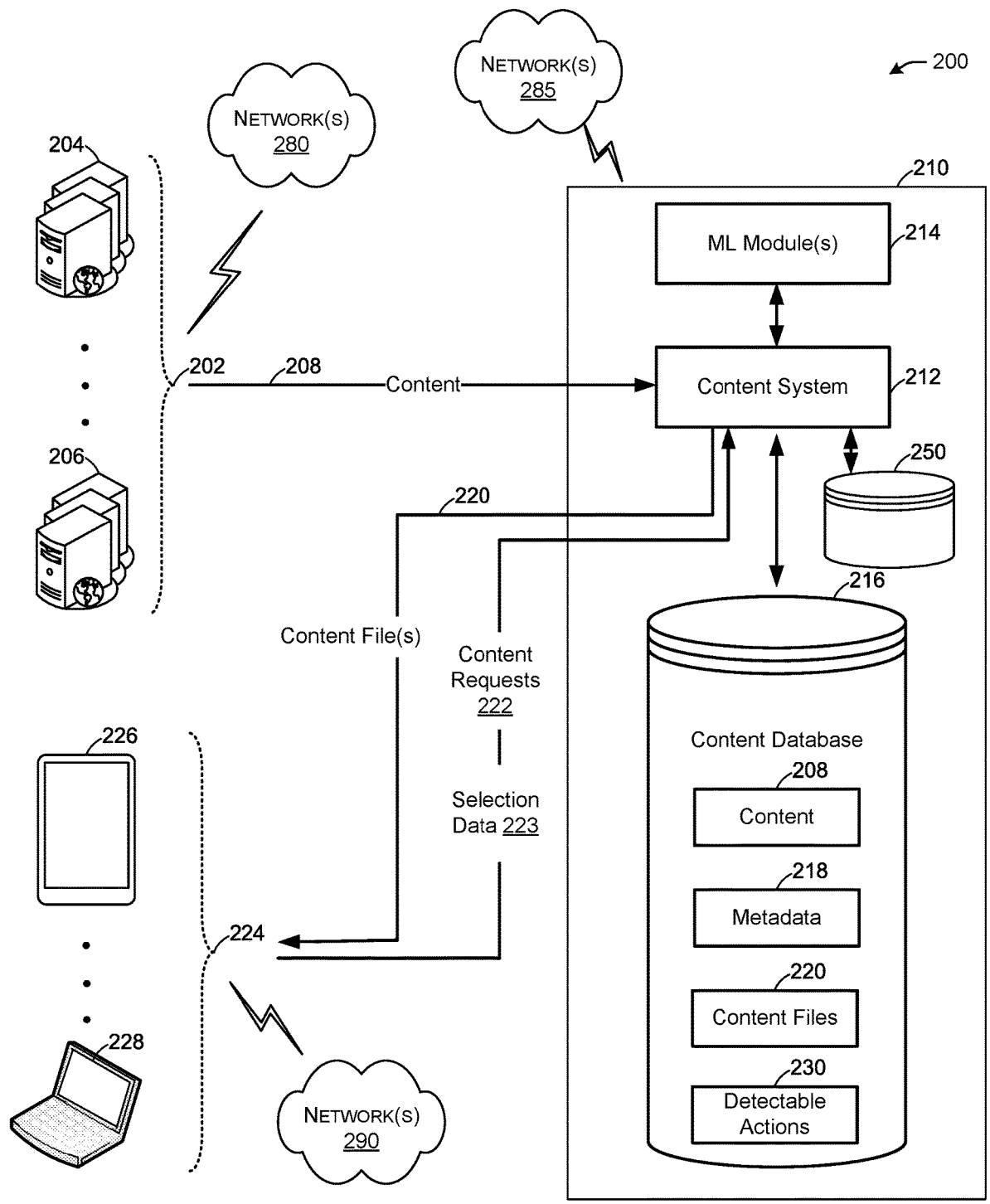
FIG. 2 illustrates a system for automated personalized Zasshi, in accordance with one or more example embodiments of the present disclosure.

FIG. 2 illustrates a system 200 for automated personalized Zasshi, in accordance with one or more example embodiments of the present disclosure.

Referring to FIG. 2A, the system 200 may include content publishing systems 202 (e.g., similar to the content publishing systems 102 of FIG. 1, and including content publishing system 204, content publishing system 206), which may provide content 208 (e.g., sample 1, sample 2, . . . , and sample N of FIG. 1, which may represent files of comic book or graphic novel content, including images, text, and metadata) to a remote network 210 (e.g., a cloud-based network). The remote network 210 may include a content system 212 (e.g., similar to the personalized content system 110 of FIG. 1), one or more machine learning (ML) modules 214, and a content database 216 (e.g., which may be one or multiple databases). The content database 216 may store the content 208, metadata 218 (e.g. similar to the metadata 140 of FIG. 1), and content files 220 (e.g., similar to the displayable content file 112 of FIG. 1).

Still referring to FIG. 2, the content system 212 may receive the content 208 from the content publishing systems 202 and store the content 208 in the content database 216. The content 208 may include one or more files of sample content for a comic book and/or graphic novel stories. The content 208 may be stored with data, tags, and/or other indicators (not shown) to identify a sample, a story, the series, the author, the publisher, the panels of the sample/story, the pages of the story, the type or category of content, features/characteristics of the panels of the sample/story, and other information. The content system 212 may generate the content files 220 using the content 208 by aggregating multiple samples (e.g., stitching multiple files of the content 208) into individual files that include multiple samples from one or more comic books and/or graphic novels. The content system 212 may receive content requests 222 and selection data 223 from one or more user devices 224 (e.g., similar to the one or more user devices 114 of FIG. 1, and including user device 226, user device 228). The content system 212 may respond to the content requests 222 (e.g., selections of links or objection in an application, message, or other selectable content presented at the one or more user devices 224) by sending the content files 220 to the one or more user devices 224.

Still referring to FIG. 2, the content database 216 may store detectable actions 230 (e.g., the selectable indicator 124 of FIG. 1, the selectable indicator 126 of FIG. 1, the selectable indicator 134 of FIG. 1, the selectable indicator 136 of FIG. 1, or other selectable actions/indictors). The detectable actions 230 may represent a user's preference, such as a selectable button or icon that is displayed with a graphic and/or text reading "Subscribe to this series," "Subscribe to this Publisher," "More Content like this," "Less Content like this," "Buy the next X Volumes of this Story," and the like. The content system 212 may receive reader selections of the detectable actions 230 (e.g., from the one or more user devices 224), which may be presented as part of the content of content files 220 or may be displayed concurrently with the content of the content files 220 (e.g., as separate files executable by the one or more user devices 224 or as code in the content files 220 that, when the content files 220 are executed, result in the one more user devices 224 displaying the detectable actions 230). The detectable actions 230 may correspond to the content displayed at a given location (e.g., page), to a specific sample, to multiple samples, to a particular panel, or to multiple panels from one or more samples. To determine the content to which a selectable indicator corresponds (e.g., which content of the multiple samples the user requested more or less of), the content system 212 may maintain the metadata 218 or other data for respective presentable content files. For example, the metadata 218 may indicate which panels, samples, and/or stories are presented on which digital pages of a presentable content file or correspond to location data (e.g., when the selection data 223 indicates a page being presented), which panels correspond to a particular selectable action (e.g., when the selectable action has an identifier that maps to one or more panels), which panels (e.g., images) are presented on which digital pages of the presentable content file or at a given time when a selectable action is received, which selectable indicators are presented on which digital pages (and at which locations) of a presentable content file, and the like. In this manner, when the content system 212 receives selections of selectable indicators from a device, the content system 212 may identify the specific presentable content file, which selectable indicator was selected, and to which panel, sample, story or series the selectable indicator corresponds.

In one or more embodiments, using the selections, the content system 212 may determine user preferences for or against certain content, and may use those preferences to identify content to include or not include in subsequent presentable content files for user or device. For example, the content system 212 may determine features/characteristics of any panel displayed, and may analyze the content 208 for matching or similar content based on matching tags, image/text analysis, similar reader preferences, and the like. When the selection data 223 includes an indication of one or more panels being displayed when a user selected a selectable action, the content system 212 may determine, using the metadata 218, that the selection data 223 is associated with a particular selectable action (e.g., corresponding to a location and/or to one or more panels) or with one or more particular panels. When the selection data 223 includes location data, such as a page being displayed, the content system 212 may use the metadata 218 to identify which panel or panels are displayed at the location.

To determine which content (e.g., which stories) were viewed/read in the content files 220, the content system 212 may generate the metadata 218 for the content files 220. The metadata 218 may indicate on which digital pages a panel, a group of panels, a story, panel, or selectable indicator is presented in a given content file of the content files 220. For example, for a given displayable content file of the content files 220 (e.g., the displayable content file 112 of FIG. 1), the metadata 218 may indicate that sample 1 of FIG. 1 is presented on pages 1-N and includes a cover image (e.g., the cover image 119 of FIG. 1), panels (e.g., panel 120 and panel 122 of FIG. 1), and is associated with one or more selectable indicators of the detectable actions 230 (e.g., the indicator 124 and the indicator 126 of FIG. 1). The metadata 218 may indicate that sample 2 of FIG. 1 is presented on pages N+1-N+Y and includes a cover image (e.g., the cover image 129 of FIG. 1), panels (e.g., the panel 130 and the panel 132 of FIG. 1), and is associated with one or more selectable indicators of the detectable actions 230 (e.g., the indicator 134 and the indicator 136 of FIG. 1).

When the content system 212 receives reader selections (e.g., as indicated by the selection data 223) of the detectable actions 230 from the one or more user devices 224, the content system 212 may match the detectable actions 230 to one or more panels, stories, and/or digital pages of a displayable content file of the displayable content files 220 using the metadata 218. For example, the content system 212 may receive from the one or more user devices 224 an indication of a selection of the selectable indicator 124 of FIG. 1 for a displayable content file (e.g., the displayable content file 112 of FIG. 1) of the content files 220. The content system 212 may determine, from the metadata 218, that the selectable indicator corresponds to sample 1 of the displayable content file or to one or more panels of sample 1, and that the selectable indicator corresponds to a user preference for more content like sample 1 and any panels of sample 1. For example, the selection data 223 may indicate particular content (e.g., a particular content file associated with an end action such as a selection of a selectable action, one or more particular panels, etc.), the location at which the selectable action occurred within a content file (e.g., a page of a book represented by a content file), an identifier of the particular end action (e.g., an identifier may correspond, using the metadata 218, to an end action identified at a particular location and associated with a particular panel, group of panels, story, or other content sample, and may correspond to one or more actions for the content system 212 to perform, such as to subscribe to content, provide more similar content, provide less similar content, and the like). The content files 220 may include codes or script corresponding to objects, such as selectable icons or other graphics that, when the content files 220 are executed and displayed at the one or more user devices 224, are selectable to readers, either as part of the content files 220 or in separate displays. When a selectable action is selected (e.g., touched, tapped, swiped, etc.), the code or script in the content files 220 may cause the one or more user devices 224 to send the selection data 223 with one or more indicators to identify the file, the content, the location, the action, and the like. The content files 220 may include sample information identifying the sample (e.g., a title such as "Sample 1"), a volume or issue, image and text data to display, and the like. The content files 220 may include page information that may define a page and its contents, such as one or more panels and/or one or more of the detectable actions 230. The metadata 218 may include the sample and/or page information along with other data to identify content displayed at a given location, which panels correspond to which samples/stories, the content displayed in a given panel or group of panels, and the like.

In one or more embodiments, the content system 212 may determine which of the content 208 to use when generating the content files 220 based on a variety of criteria. The content system 212 may track how often content is read (e.g., individual stories, volumes, series, etc.) by all readers or groups of readers (e.g., based on location, demographics, etc.), how often a sample (e.g., a story or portion of a story) is included in a displayable content file such as a Manga, how often or how many people "convert" after reading a sample (e.g., how often a reader of a story selects a selectable indicator that indicates a request for a subscription to the story/series, a preference for more content of the story/series, and the like). For example, the content system 212 may determine that the number of readers who consumed content and purchased the content and/or additional content exceeds or fails to exceed a threshold, indicating how successful given content may be at generating conversions. Content more successful at generating conversions may be more likely to be selected as content for a sample than content less likely to generate conversions. The one or more user devices 224 may provide, with user consent, browsing history to the content system 212, and the content system 212 may determine which story/series titles, content categories, and the like that a user or device browsed (e.g., based on webpage or other product page cookies or activity logs, etc.), and which stories/series a user or device viewed and bought or subscribed to compared to which stories/series a user or device viewed without purchasing or subscribing. The one or more ML modules 214 may use ML techniques, such as neural networks and other machine learning, to provide content recommendations to the content system 212.

In one or more embodiments, the content system 212 and/or the one or more ML modules 214 may use "series logic" to identify stories that are part of a series. For example, the content system 212 and/or the one or more ML modules 214 may determine that a reader has read one story of a series (e.g., sample 1 of FIG. 1, where sample 1 may be part of a story of a series with multiple stories), as the content system 212 may receive selections of selectable indicators and/or may receive data from the one or more user devices 224 that a reader has browsed a sample, read a sample, purchased a sample or story, and the like, and the content system 212 and/or the one or more ML modules 214 may use series logic to determine that the reader has a preference for other samples or stories of the same series. The content system 212 may include one or more subsequent stories in a series in one or more subsequent displayable content files of the content files 220. The content system 212 and/or the one or more ML modules 214 may use browsing and/or purchase history to determine other series that a reader may be interested in given a reader's interest in a series. For example, the content system 212 and/or the one or more ML modules 214 may determine that readers of series X may have purchased or subscribed to series Y, so when a reader indicates a preference for series X (e.g., from having read series X or providing a selection of a selectable indicator indicating a preference for more content similar to or included in series X), the content system 212 and/or the one or more ML modules 214 may determine that series X readers have also indicated a preference for series Y, and may provide stories (e.g., samples) of series Y in one or more subsequent displayable content files for a reader. Data from the database 250 may include customer data indicating popular content, which content that was read by readers led to purchases of more content, which content is popular with readers of certain demographics or readers who liked other types of content, and the like. The one or more ML modules 214 and/or the content system 212 may use the customer data from the database 250 to determine content to provide as samples in the content files 220.

In one or more embodiments, to determine that a reader has read a sample, the content system 212 may receive the selection data 223 from the one or more user devices 224 indicating that a reader has opened a displayable content file of the content files 220 (e.g., the displayable content file 112 of FIG. 1), that the one or more user devices 224 have rendered a digital page or panel of a displayable content file, that a reader has selected a selectable indicator of a displayable content file, and/or the location or panel that was displayed when the selectable indicator was selected. Readers may be presented with options to write a product review and/or to recommend a story, series, author, publisher, and the like to another reader. The content system 212 may receive the selection data 223 from the one or more user devices 224 or from other devices indicating that a reader has provided a product review or recommendation of content, and may determine a user preference for the content.

In one or more embodiments, the content system 212 and/or the one or more ML modules 214 may use tags, metadata, and/or other types of data for panels, stories, series, publishers, authors, and the like to identify similar content. For example, the metadata 218 for a story may include tags or other identifiers for a panel, group of panels, the story, a series that includes the story, an author of the story, a publisher of the story, and one or more product categories or genres. When the content system 212 and/or the one or more ML modules 214 identifies a reader preference for any content, the content system 212 and/or the one or more ML modules 214 may use the tags or other identifiers to locate or request content (e.g., from content catalogs provided by the content publisher systems 102) having one or more of the same tags and/or identifiers. The one or more ML modules 214 may analyze individual panels or groups of panels (e.g., all or a subset of panels of a sample) for artwork, object detection, facial detection, text, tags, and the like, by using image and/or text analysis techniques and/or by analyzing tags, identifiers, or other information received with the content 208 that identifies characteristics of the panels being displayed in the content 208. When the one or more ML modules 214 identify, using the metadata 218 and the selection data 223, which panels were viewed and liked or disliked, the one or more ML modules 214 may identify other content having the same tags, artwork, styles, actions, text, or other characteristics from the content 208, and may use the related content in a subsequent sample for a given reader.

In one or more embodiments, the detectable actions 230 may allow users to opt into or follow a series, author, publisher, content type or genre, and the like. The content system 212 may receive a selection of one or more selectable indicators and identify content from a respective series, author, publisher, content type or genre, and may request the content or listen to content streams (e.g., provided by the content publisher systems 202 or other systems) for content having the respective series, author, publisher, content type or genre. The content system 212 or another device of the remote network 210 may generate e-mails or other messages that notify readers of the one or more user devices 224 that preferred content has become available, and/or that other relevant content may be recommended to the reader based on selected preferences and/or analysis of what the reader has read, subscribed to, and/or purchased. For example, an e-mail or other message may include a link that, when selected on the one or more user devices 224, may cause the rendering of a displayable content file of the content files 220 in an application (e.g., a web browser or mobile application page) executing on the one or more user devices 224. The detectable actions 230 may correspond to one or more panels displayed by execution of the content files 220 or to a location (e.g., page), and the selection data 223 may include the indicator of a specific detectable action, the panel or panels to which a detectable action corresponds, and/or the location of the detectable action (e.g., the page on which the detectable action was displayed). In some embodiments, the detectable actions 230 may not correspond to a particular panel, story, or location, and instead may be displayed regardless of which panel or page is displayed. In such embodiments, the selection data 223 may indicate which panel or page is being displayed when a detectable action was received.

In one or more embodiments, a displayable content files 220 may be displayable to the one or more user devices 224 when executed using an application, such as a mobile application, web browser, or other application. For example, an electronic reader application, library application, content viewer application, or other type of device application may execute the displayable content files 220 to present the content (e.g., the samples). The one or more user devices 224 may access one or more web pages where, upon selection of a link or other object, the displayable content files 220 may be loaded for presentation using the web browser.

In one or more embodiments, the content publisher systems 202, the content system 212, and/or the one or more user devices 224 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The content publisher systems 202 may be configured to communicate via a communications network 280, the remote network 210 may be configured to communicate via a wireless communications network 285, and the one or more user devices 224 may be configured to communicate via a wireless communications network 290 wirelessly or wired (e.g., the same or different wireless communications networks). The communications network 280, the communications network 285, and/or the communications network 290 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 280, the communications network 285, and/or the communications network 290 may have any suitable communication range associated therewith and may include, for example, global networks (e.g., the Internet), metropolitan area networks (MANs), wide area networks (WANs), local area networks (LANs), or personal area networks (PANs). In addition, the communications network 280, the communications network 285, and/or the communications network 290 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 3A:
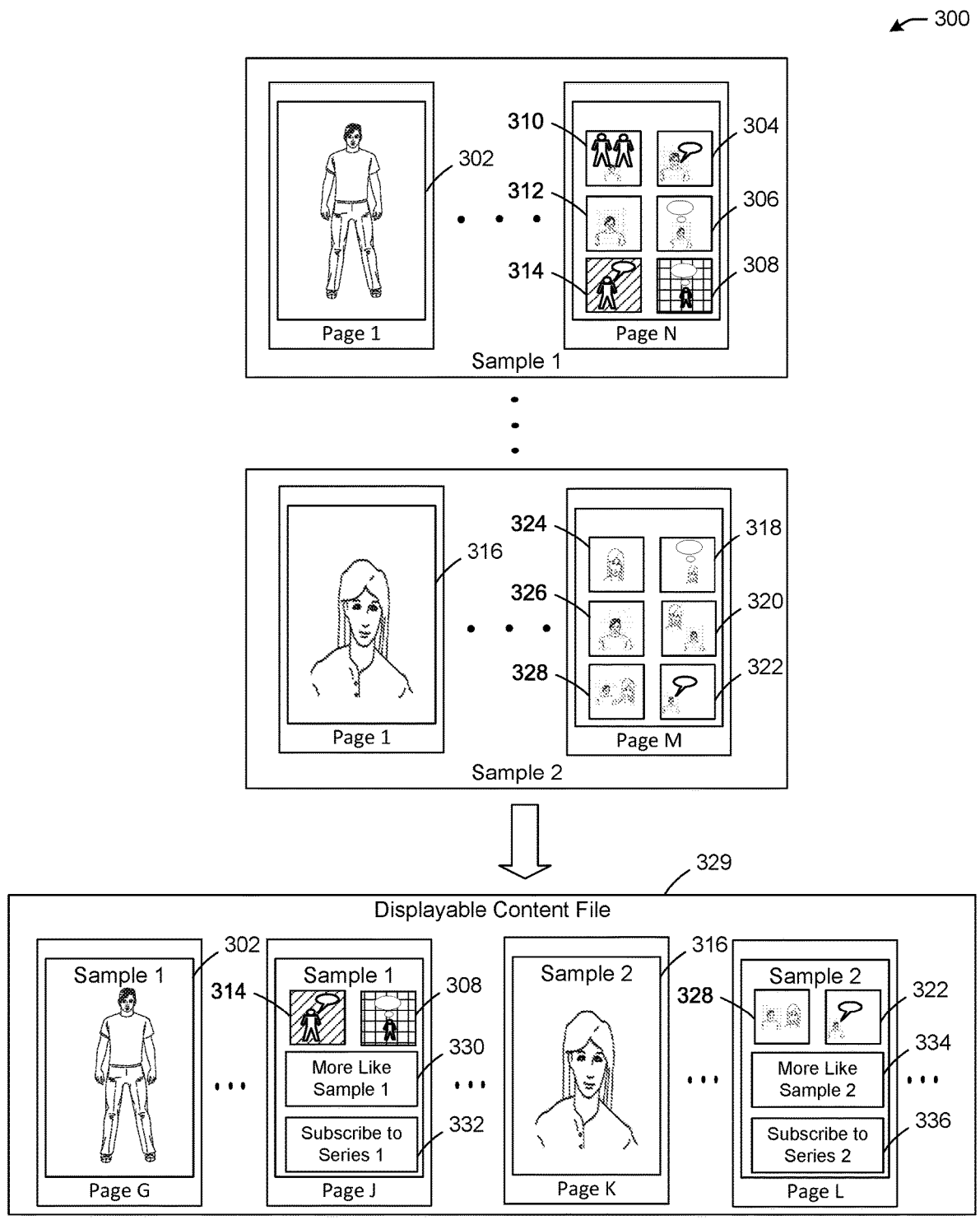
FIG. 3A illustrates a process for automated personalized Zasshi, in accordance with one or more example embodiments of the present disclosure.

FIG. 3A illustrates a process 300 for automated personalized Zasshi, in accordance with one or more example embodiments of the present disclosure.

Referring to FIG. 3A, the process 300 may include aggregating sample 1 and sample 2, each which may be represented by one or multiple computer-executable files and may represent different comic books, graphic novels, or different volumes or issues of a comic book or graphic novel. Sample 1 may include pages 1-N, with a cover image 302 being presented on page 1. The cover image 302 may include a title, author, publisher, volume, issue, and/or series, although not shown in FIG. 3A. Pages 1-N of the sample 1 may include panels, which may include drawings, text, and/or graphics used to present the story 1. For example, a page (e.g., page N) may include panel 304, panel 306, panel 308, panel 310, panel 312, and panel 314, or any number of panels included in the sample 1. Sample 2 may include pages 1-M, beginning with a cover image 316 on page M, and including multiple panels on pages 1-M. For example, page M may include panel 318, panel 320, panel 322, panel 324, panel 326, and panel 328, or any number of panels of the sample 2.

Still referring to FIG. 3A, to generate a displayable content file 329, a system (e.g., the personalized content system 110 of FIG. 1, the content system 212 of FIG. 2) may combine the sample 1 and the sample 2 from multiple media files into the displayable content file 329. The displayable content file 329 may include additional samples, and the sample 1 and the sample 2 may be presented in any order or location within the displayable content file 329. For example, sample 1 may be presented on pages G-J in the displayable content file 329, and sample 2 may be presented on pages K-L in the displayable content file 329. The displayable content file 329 may include additional content other than the panels and cover images of the stories.

For example, the displayable content file 329 may include selectable indicators (e.g., the detectable actions 230 of FIG. 2). Before, during, or after the panels of the sample 1 are presented, a selectable indicator 330 and a selectable indicator 332 may be presented to allow a reader to indicate that the reader read the sample 1, wants more content similar to the sample 1, or wants less content like the sample 1. For example, the selectable indicator 330 may indicate a selectable user preference to receive subsequent displayable content files with "More like Sample 1" (e.g., additional samples by the same author or same publisher, additional samples in the same series, comic book, or graphic novel, additional samples sharing the same content type, genre, category, etc.). The selectable indicator 332 may provide a selectable request to "Subscribe to Series 1," which may refer to a user preference to purchase all or a subset of other samples/stories in the same series as sample 1. The selectable indicators may provide selectable indicators to receive less content like sample 1, or to end a subscription to the series which includes sample 1. The displayable content file 329 may present selectable indicator 334 and selectable indicator 336. The selectable indicator may provide a selectable user preference to read "More like Sample 2," and the selectable indicator 336 may provide a selectable user preference to "Subscribe to Series 2," where sample 2 is from one story in the series 2.

As explained further below with reference to FIG. 3B, selection of the selectable indicators (e.g., selectable indicator 330, selectable indicator 332, selectable indicator 334, selectable indicator 336) may allow a system (e.g., the personalized content system 110 of FIG. 1, the content system 212 of FIG. 2) to determine which samples of the aggregated stories of the displayable content file 329 were read and preferred or not preferred, subscribed to, purchased, etc. Other selectable indicators may be presented anywhere in the displayable content file 329 and may indicate a preference to read more content like any or all content presented in the displayable content file 329. Other selectable indicators may provide selectable indications of preferences for particular authors, publishers, series, content types or genres, panels, and the like. Some selectable indicators may present an option to provide product reviews (e.g., a selection of such a selectable indicator may cause presentation of a form or application into which a reader may provide comments regarding one or more stories of the displayable content file 329) or product recommendations (e.g., a selection of such a selectable indicator may cause presentation of a form or application into which a reader may enter contact information or selection of user accounts to which to recommend stories).

Figure 3B:
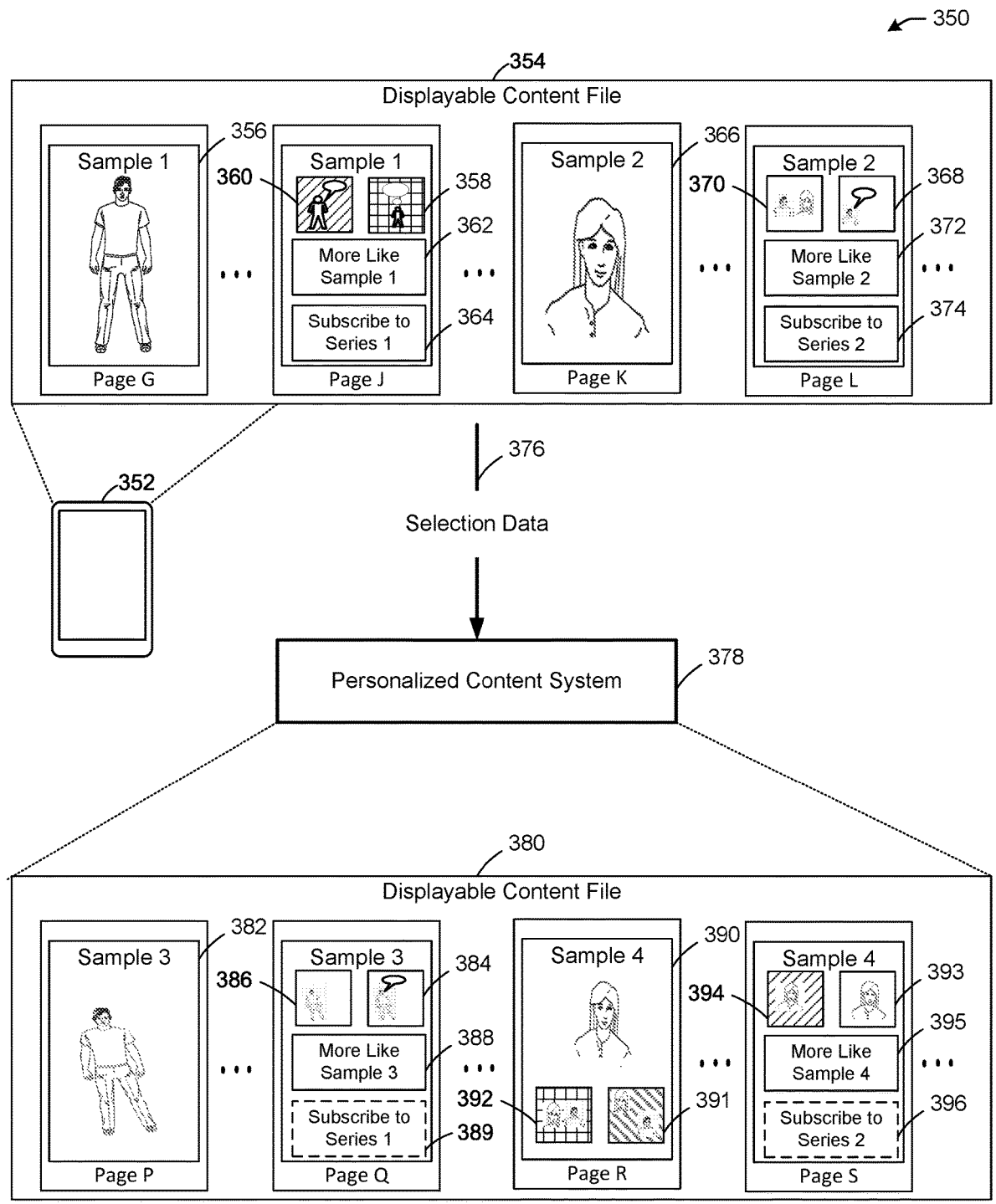
FIG. 3B illustrates a process for automated personalized Zasshi, in accordance with one or more example embodiments of the present disclosure.

FIG. 3B illustrates a process 350 for automated personalized Zasshi, in accordance with one or more example embodiments of the present disclosure.

Referring to FIG. 3B, the process 350 may include a user device 352 (e.g., similar to the one or more user devices 114 of FIG. 1, the one or more user devices 224 of FIG. 2) displaying a displayable content file 354 and determining one or more additional displayable content files based on reader interaction with the displayable content file 354. The displayable content file 354 may include multiple samples, consisting of one or multiple media files for each sample, aggregated into a single computer-executable file. The displayable content file 354 may include sample 1 on digital pages G-J (e.g., digital pages displayed when the displayable content file 354 is rendered), sample 2 on digital pages K-L, and any other number of samples in any order. The sample 1 may include a cover image 356 and one or more panels (e.g., panel 358, panel 360), and may be presented with one or more selectable indicators (e.g., selectable indicator 362 indicative of a selectable preference to read "More Like Sample 1," selectable indicator 364 indicative of a selectable preference to "Subscribe to Series 1" in which series 1 includes sample 1 and other samples and/or stories, such as different volumes or issues of a comic book or graphic novel). Sample 2 may include a cover image 366 and one or more panels (e.g., panel 368, panel 370), and may be presented with one or more selectable indicators (e.g., selectable indicator 372 indicative of a selectable preference to read "More Like Sample 2," selectable indicator 374 indicative of a selectable preference to "Subscribe to Series 2" in which series 2 includes sample 2 and other samples/stories, such as different volumes or issues of a comic book or graphic novel).

Still referring to FIG. 3B, a personalized content system 378 (e.g., similar to the personalized content system 110 of FIG. 1 and the content system 212 of FIG. 2) may receive, from the user device 352, one or more selections 376 (e.g., selection data) of the one or more selectable indicator, and/or data indicative that the displayable content file 354 was rendered, and/or which digital pages of the displayable content file 354 were rendered. The one or more selections 376 may identify the selectable indicators which were selected or otherwise interacted with (e.g., touched, clicked, tapped, swiped, etc.). The personalized content system 378 may identify the selected indicators and determine a panel, group of panels, story, series, author, publisher, content type or genre, or other information associated with the selected indicator. For example, when the one or more selections 376 includes an indication that the selectable indicator 362 was selected, the personalized content system 378 may identify (e.g., using the metadata 140 of FIG. 1 or the metadata 218 of FIG. 2) that the selectable indicator 362 indicates a reader preference for more content like sample 1 or any portion of sample 1, such as one or more panels. The personalized content system 378 may use metadata, tags, or other identifiers associated with the series 1 to determine similar content based on a same author or publisher, a same content type or genre, a series that includes the sample 1, and the like.

For example, the personalized content system 378 may determine based on end actions (e.g., selections of selectable indicators, product reviews provided, recommendations given by a reader, etc.) that a reader may prefer sample 3 and sample 4 in a subsequent displayable content file (e.g., displayable content file 380). The personalized content system 378 may generate the displayable content file 380 by aggregating one or more files for the sample 3 and one or more files with the sample 4. For example, the displayable content file 380 may include the sample 3 on digital pages P-Q, and may include the sample 4 on digital pages R-S in any order along with any other samples identified based on end actions and other criterion described herein. The sample 3 may begin with a cover image 382 identifying the sample 3, and may include panel 384 and panel 386. The sample 3 may be presented with one or more selectable indicators (e.g., selectable indicator 388 indicating a preference to read "More Like Sample 3," selectable indicator 389 indicating a preference to "Subscribe to Series 1" including sample 3 when the reader has not already subscribed to series 1). The sample 4 may begin with a cover image 390 identifying the sample 4, and may include panel 391, panel 392, panel 393, and panel 394. The sample 4 may be presented with one or more selectable indicators (e.g., selectable indicator 395 indicating a preference to read "More Like Sample 4," selectable indicator 396 indicating a preference to "Subscribe to Series 2" including sample 4 when the reader has not already subscribed to series 2). In this manner, based on end actions associated with the displayable content file 354, the personalized content system 378 may generate the displayable content file 380.

In one or more embodiments, the one or more selections 376 may include selection data (e.g., the selection data 223 of FIG. 2), which may sent to the personalized content system 378 in response to a selection of a selectable action, in response to a user action such as providing a product review or making a purchase, in response to a user indicating whether they like or dislike a sample or portion of a sample (e.g., the personalized content system 378 may generate inquiries presented at the user device 352 to which a reader may respond), and the like. The one or more selections 376 may be specific to any panel, group of panels, story, and/or page or other location within the content displayed when the displayable content file 354 is presented.

Figure 4A:
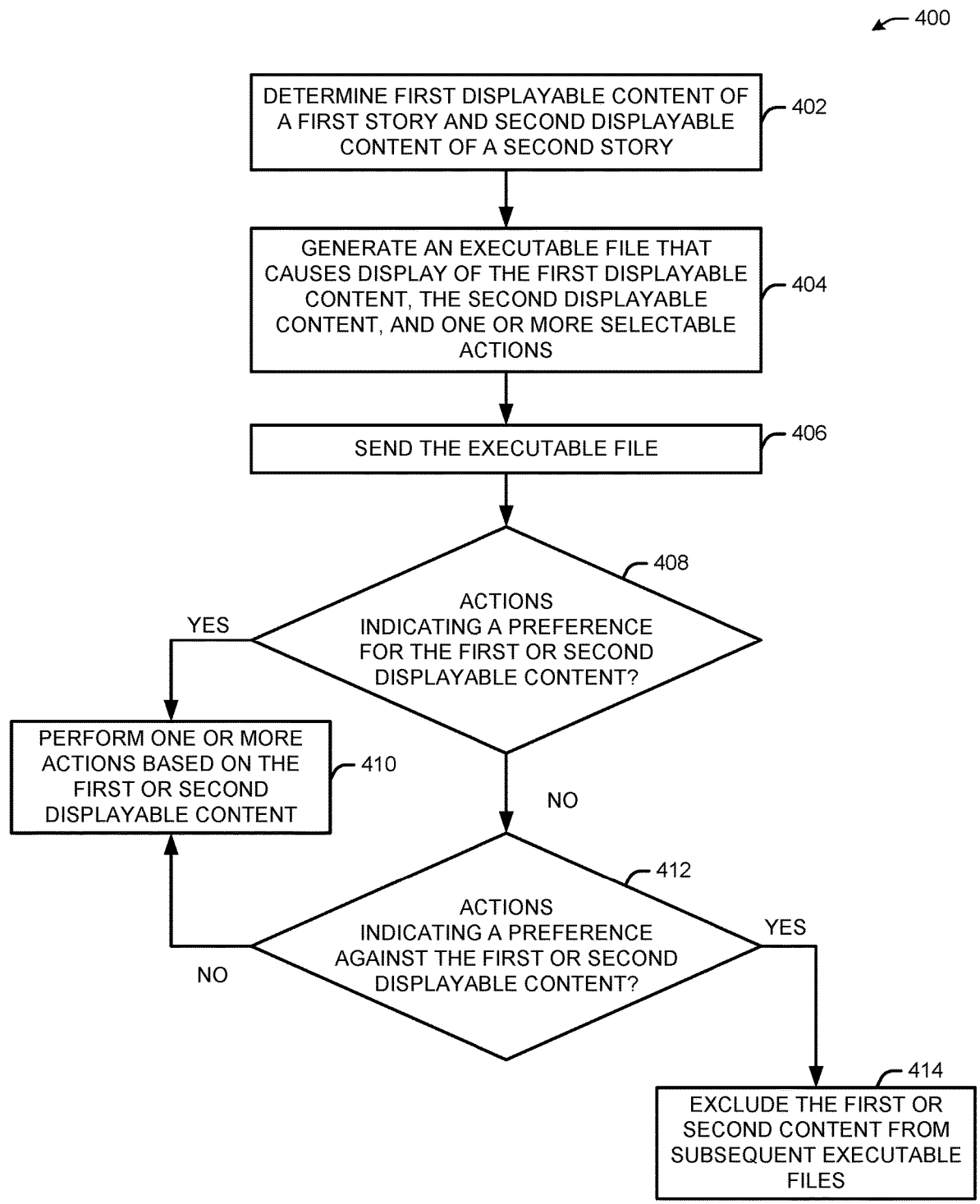
FIG. 4A illustrates a flow diagram for a process for automated personalized Zasshi, in accordance with one or more example embodiments of the present disclosure.

FIG. 4A illustrates a flow diagram for a process 400 for automated personalized Zasshi, in accordance with one or more example embodiments of the present disclosure.

At block 402, a system (e.g., the personalized content system 110 of FIG. 1, the content system 212 of FIG. 2) may determine first displayable content of a first story (e.g., the sample 1 of FIG. 1, the sample 1 of FIG. 3A, the sample 3 of FIG. 3B) and second displayable content of a second story (e.g., the sample 2 of FIG. 1, the sample 2 of FIG. 3A, the sample 4 of FIG. 3B). The first content (e.g., a sample) may be received from a content publisher (e.g., the content publisher system 104 of FIG. 1, the content publisher system 204 of FIG. 2) and may be represented by one or more multiple computer-executable media files. The second content (e.g., a sample) may be received from a same or different content publisher (e.g., the content publisher system 106 of FIG. 1, the content publisher system 206 of FIG. 2) and may be represented by one or more multiple computer-executable media files. The samples may be from the same comic book or graphic novel or from different comic books or graphic novels, and may be from a same series of stories, from different series, or may not be part of a series. The samples may represent samples from a respective volume or issue of a comic book or graphic novel. The samples may include all panels or a subset of panels of any given comic book or graphic novel. The panels may include image data and/or text data and may be received as a sample portion of a larger story, or the system may receive an entire story, chapter, episode, or volume and generate samples using a subset of the panels.

At block 404, the system may generate an executable file (e.g., the displayable content file 112 of FIG. 1, the displayable content file 329 of FIG. 3A, the displayable content file 380 of FIG. 3B) that, when executed by a device (e.g., the one or more user devices 114 of FIG. 1, the one or more user devices 224 of FIG. 2, the user device 352 of FIG. 3B), causes display of the first and second content (in any order), along with other content aggregated in the executable file. The executable file, when selected and executed, may begin at a default page, such as a cover page, a table of contents indicating the stories included in the executable file and their respective pages, or may open to a cover image of a story included in the executable file. The content of the executable file may be arranged on multiple digital pages, and a reader may open, select, scroll, turn, or otherwise navigate from one page to another page of the executable file when executed. The executable file may add selectable actions to the first and second content to allow a user to indicate a preference or request for more or less content like the content in the executable file (e.g., the selectable indicator 124 of FIG. 1, the selectable indicator 126 of FIG. 1, the selectable indicator 134 of FIG. 1, the selectable indicator 136 of FIG. 1, the selectable indicator 330 of FIG. 3A, the selectable indicator 332 of FIG. 3A, the selectable indicator 334 of FIG. 3A, the selectable indicator 336 of FIG. 3A, the selectable indicator 388 of FIG. 3B, the selectable indicator 389 of FIG. 3B, the selectable indicator 395 of FIG. 3B, the selectable indicator 396 of FIG. 3B).

At block 406, the system may send the executable file (e.g., to a user device or an application, such as a web browser or mobile application executable at a user device to cause display of the executable file). The system may provide the file to a web server or device from where the executable file may be accessed. The system may receive one or more application programming interface (API) calls for content, and the system may respond by sending the executable file through an API or other interface.

At block 408, the system may determine whether any actions (e.g., selectable actions or other reader actions) have been taken by a reader and are indicative of a preference for (e.g., supporting or requesting) the first or second content in the executable file. For example, one or more of the selectable actions may be selected or otherwise interacted with, indicating a user request for more content like any or all of the panels or samples in the executable file, such as more content from a same series, author, publisher, content type or genre, or more content like one or more panels (e.g., based on the image and/or text data of the one or more panels) and the like. The system may rely on any combination of metadata (e.g., the metadata 140 of FIG. 1, the metadata 218 of FIG. 2), tags, or other identifiers which may be used to identify the panel, group of panels, sample, series, author, publisher, content type or genre, and the like. When the system identifies an action indicative of a preference for more content such as the content in the executable file, the process 400 may continue to block 410. When the system does not identify an action indicative of a preference for more content such as the content in the executable file, the process 400 may continue to block 412. The actions may include other actions such as a reader browsing content, writing a product review, making a product recommendation, or purchasing content.

At block 410, the system may perform one or more actions based on the first or second displayable content (e.g., based on which content in the executable file was associated with the action requesting more similar content). The system may determine which content was read (e.g., individual panels, stories, volumes, series chapters, episodes, etc.) by all readers or groups of readers (e.g., based on location, demographics, etc.), how often a sample (e.g., a story) is included in a displayable content file such as a Manga, how often or how many people "convert" after reading a sample (e.g., how often a reader of a story selects a selectable indicator that indicates a request for a subscription to the story/series, a preference for more content of the story/series, and the like). The system may receive, with user consent, browsing history, and the system may determine which story/series titles, content categories, and the like that a user or device browsed (e.g., based on webpage or other product page cookies or activity logs, etc.), and which stories/series a user or device viewed and bought or subscribed to compared to which stories/series a user or device viewed without purchasing or subscribing. The system may use "series logic" to identify stories that are part of a series. For example, the system may determine that a reader has read one story of a series (e.g., story 1 of a series with multiple stories), as the system may receive selections of selectable indicators and/or may receive data indicative that a reader has browsed story 1, read story 1, purchased story 1, and the like, and the system may use series logic to determine that the reader has a preference for other stories of the same series. The system may include one or more subsequent stories in a series in one or more subsequent displayable content files. The system may use browsing and/or purchase history to determine other series that a reader may be interested in given a reader's interest in a series. For example, the system may determine that readers of series X may have purchased or subscribed to series Y, so when a reader indicates a preference for series X (e.g., from having read series X or providing a selection of a selectable indicator indicating a preference for more content similar to or included in series X), the system may determine that series X readers have also indicated a preference for series Y, and may provide stories (e.g., samples) of series Y in one or more subsequent displayable content files for a reader.

At block 412, the system may determine one or more actions based on the first or second displayable content (e.g., based on which content in the executable file was associated with the action requesting less similar content). The system may receive selection data indicative of actions, such as user selections of indicators that indicate a user preference for or against content, an author, a publisher, a content series, panels (e.g., the image data and/or text data of a panel) and the like. The selection data (e.g., the selection data 223 of FIG. 2) may include identifiers, such as a page or other location data of the executable file that indicates where the selectable action occurred, identifiers mapping to a particular action (e.g., provide more content or less content similar to the first or second content), an indication of one or more panels presented when the action was taken, the content that a user reviewed, recommended, or purchased, and the like. Using metadata, the selection data may determine which content a selectable action is related to, and what actions to take based on the selectable action, such as whether the selectable action requests more similar content, to stop receiving content from a content series, publisher, or the like, to subscribe to content, to purchase content, to continue reading more from content that has been read, to see more or less of a panel based on panel image data and/or text data, and the like. When no end actions are taken indicating a preference against content (e.g., no selections of selectable actions indicating that a reader does not want more content from a particular series, publisher, author, content type or genre, etc.), the process 400 may continue at block 410. When an end action is taken that indicates a preference against content is received (e.g., based on received selection data from a device displaying the executable content file), the process 400 may continue to block 414.

At block 414, the system may determine one or more preferences based on the selectable actions received for the executable file. The preferences may indicate that content from a particular panel, group of panels, series, publisher, author, content type or genre, and the like should be excluded from a subsequent executable file. The system may determine content for one or more subsequent executable files excluding content that does not meet user preferences, and including content that meets user preferences. The preferences may be determined based on the selection data indicating selections of selectable indicators that may be presented at a device when the executable file is displayed, and metadata may be used by the system to identify the selectable actions, content associated with the selectable actions, and preferences based on the content and selectable actions. In this manner, the system may receive requests for more or less content, and may use selection data and metadata to determine which content a reader prefers and does not prefer. An absence of a selectable action, such as an action indicating that a reader does not want more of the same content, may be interpreted as an invitation to provide more of the same or similar content.

Figure 4B:
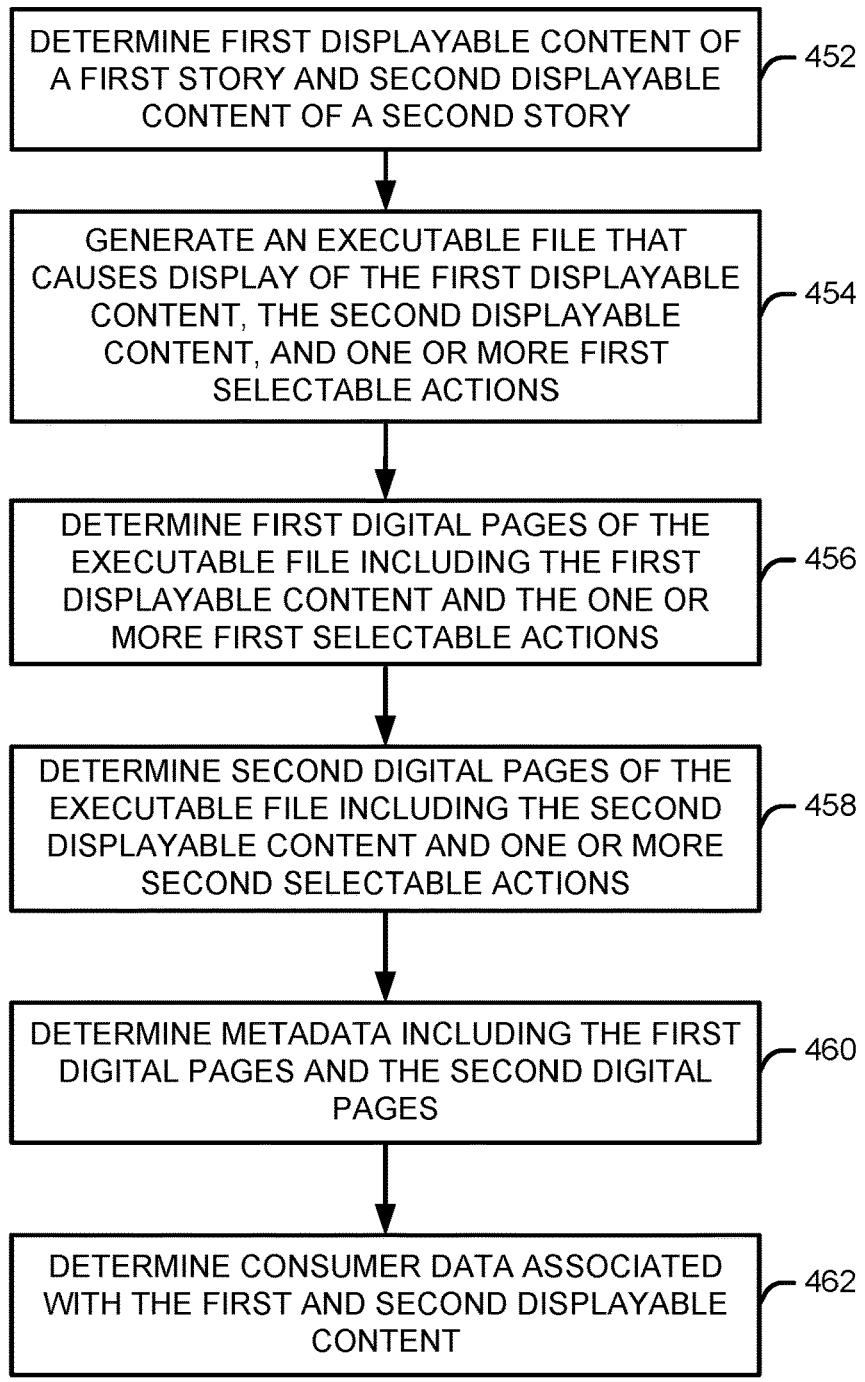
FIG. 4B illustrates a flow diagram for a process for automated personalized Zasshi, in accordance with one or more example embodiments of the present disclosure.

FIG. 4B illustrates a flow diagram for a process 450 for automated personalized Zasshi, in accordance with one or more example embodiments of the present disclosure.

At block 452, a system (e.g., the personalized content system 110 of FIG. 1, the content system 212 of FIG. 2) may determine first displayable content of a first story (e.g., the sample 1 of FIG. 1, the sample 1 of FIG. 3A, the sample 3 of FIG. 3B) and second displayable content of a second story (e.g., the sample 2 of FIG. 1, the sample 2 of FIG. 3A, the sample 4 of FIG. 3B). The first content (e.g., a sample) may be received from a content publisher (e.g., the content publisher system 104 of FIG. 1, the content publisher system 204 of FIG. 2) and may be represented by one or more multiple computer-executable media files. The second content (e.g., a sample) may be received from a same or different content publisher (e.g., the content publisher system 106 of FIG. 1, the content publisher system 206 of FIG. 2) and may be represented by one or more multiple computer-executable media files. The sample may be from the same comic book or graphic novel or from different comic books or graphic novels, and may be from a same series of stories, from different series, or may not be part of a series. The stories may represent samples from a respective volume or issue of a comic book or graphic novel. The samples may include all or a subset of panels of a story, and the panels, which may include image data and/or text data, may be preselected (e.g., received by the system) or determined by the system based on any combination of user preferences and/or consumer data.

At block 454, the system may generate an executable file (e.g., the displayable content file 112 of FIG. 1, the displayable content file 329 of FIG. 3A, the displayable content file 380 of FIG. 3B) that, when executed by a device (e.g., the one or more user devices 114 of FIG. 1, the one or more user devices 224 of FIG. 2, the user device 352 of FIG. 3B), causes display of the first and second content (in any order), along with other content aggregated in the executable file. The executable file, when selected and executed, may begin at a default page, such as a cover page, a table of contents indicating the samples included in the executable file and their respective pages, or may open to a cover image of a story included in the executable file. The content of the executable file may be arranged on multiple digital pages, and a reader may open, select, scroll, turn, or otherwise navigate from one page to another page of the executable file when executed. Each page may display one panel or multiple panels, and may display one or more selectable actions. Alternatively, the one or more selectable actions may be presented concurrently with a page, but not within the executable file. The executable file may add selectable actions to the first and second content to allow a user to indicate a preference or request for more or less content like the content in the executable file (e.g., the selectable indicator 124 of FIG. 1, the selectable indicator 126 of FIG. 1, the selectable indicator 134 of FIG. 1, the selectable indicator 136 of FIG. 1, the selectable indicator 330 of FIG. 3A, the selectable indicator 332 of FIG. 3A, the selectable indicator 334 of FIG. 3A, the selectable indicator 336 of FIG. 3A, the selectable indicator 388 of FIG. 3B, the selectable indicator 389 of FIG. 3B, the selectable indicator 395 of FIG. 3B, the selectable indicator 396 of FIG. 3B).

At block 456, the system may determine first digital pages of the executable file, including the pages that, when the executable file is executed, display the first content and the selectable actions associated with the first content (e.g., pages 1-N as shown in FIG. 1). At block 458, the system may determine second digital pages of the executable file, including the pages that, when the executable file is executed, display the second content and the selectable actions associated with the second content (e.g., pages N+1-N+Y as shown in FIG. 1). When generating the executable file, the system may determine the number of pages used to display the samples from the stories included in the executable file. For example, when a story includes 100 panels, and the first content is a sample of ten of the 100 panels of the story, the system may determine the number of pages with which to display the 10 panels (e.g., if panels 1-10 of a story are selected for the first content, and panels 1-10 use five pages for display, then the first digital pages may include five pages, plus any additional pages used to show a cover image for the first story and to display the selectable actions allowing a reader to indicate a preference for or against content like the first story). Because the executable file may aggregate content from multiple sources, the system may determine, based on the order and length of the content samples included in the executable file, the respective pages or other locations of the content for each sample and the corresponding end actions.

At block 460, the system may determine metadata (e.g., the metadata 140 of FIG. 1) and/or other data for the executable file, such as the first and second digital pages, and/or any locations corresponding to locations where content is displayed (e.g., on which pages of a digital book) at a device when the executable file is executed. The metadata may include identifiers for the executable file, identifiers for end actions (e.g., an identifier for the selectable indicator 124 of FIG. 1) that correspond to a particular content sample (e.g., the first content or the second content) and/or a location (e.g., Page N corresponding to story 1 of FIG. 1), and that correspond to a particular action or set of actions. For example, when the executable file is executed and content is displayed at a device, code on the executable file may cause presentation of selectable actions that, when selected, cause the device displaying the content of the executable file to send selection data to the system. The system may use the selection data to identify the file, the content, and preferences based on the actions.

At block 462, the system may determine consumer data associated with the first and second displayable content. The consumer data may be stored in a database or other storage (e.g., the database 250 of FIG. 2), and may indicate content that one or more users have browsed (e.g., using browsing history, cookies, and the like), content that users have recommended and/or purchased, content that users have reviewed, content that users who liked other content also like, content that users read and purchased, content that is popular among one or more demographics, and the like. The system may use any combination of the consumer data and/or the metadata to identify content to provide or recommend to a user in a sample.

Figure 5:
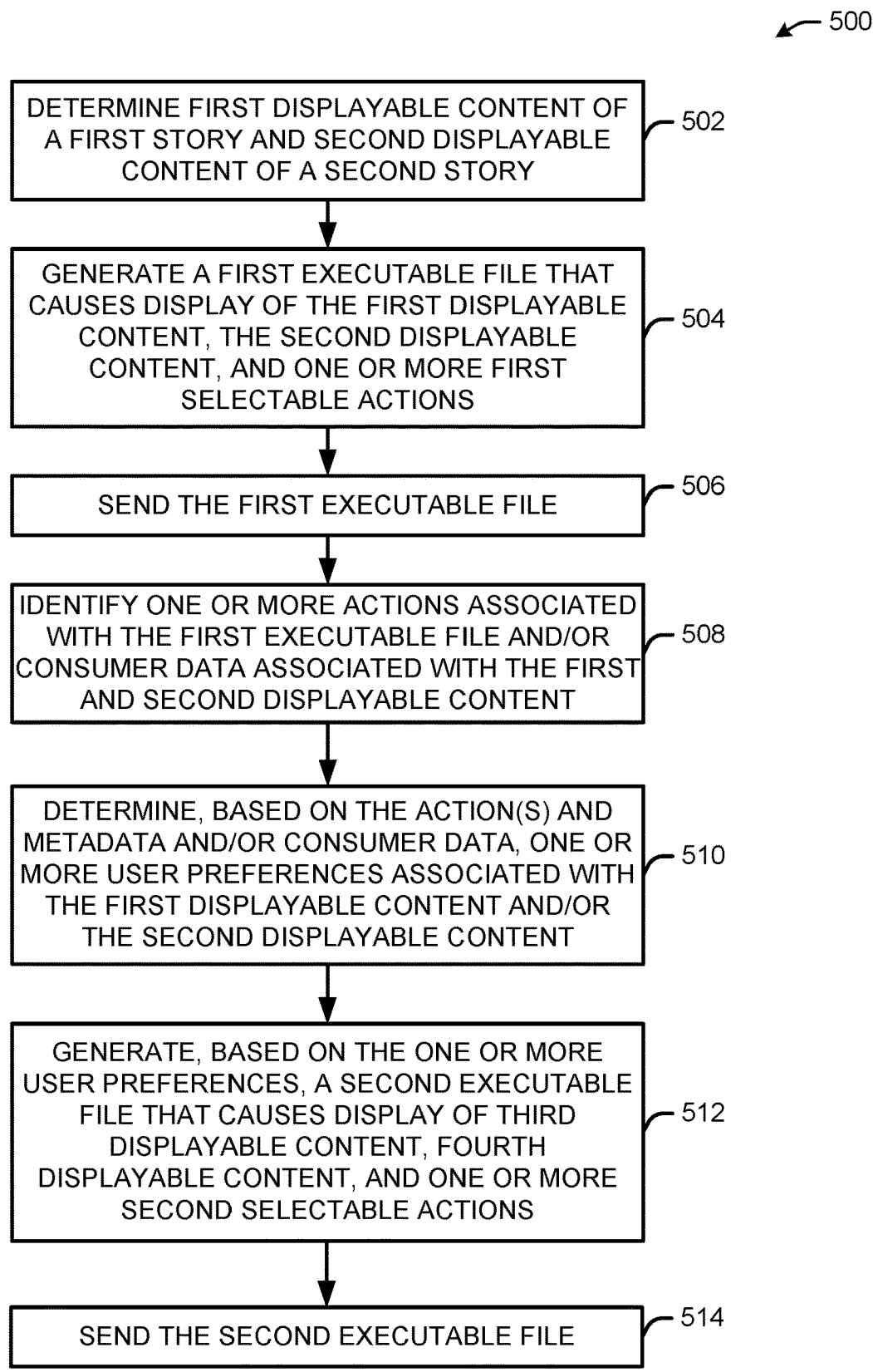
FIG. 5 illustrates a flow diagram for a process 500 for automated personalized Zasshi, in accordance with one or more example embodiments of the present disclosure.

FIG. 5 illustrates a flow diagram for a process 500 for automated personalized Zasshi, in accordance with one or more example embodiments of the present disclosure.

At block 502, a system (e.g., the personalized content system 110 of FIG. 1, the content system 212 of FIG. 2) may determine first displayable content (e.g., a sample) of a first story (e.g., the story 1 of FIG. 1, the sample 1 of FIG. 3A, the sample 3 of FIG. 3B) and second displayable content of a second story (e.g., the sample 2 of FIG. 1, the sample 2 of FIG. 3A, the sample 4 of FIG. 3B). The first content (e.g., a sample) may be received from a content publisher (e.g., the content publisher system 104 of FIG. 1, the content publisher system 204 of FIG. 2) and may be represented by one or more multiple computer-executable media files. The second content (e.g., a sample) may be received from a same or different content publisher (e.g., the content publisher system 106 of FIG. 1, the content publisher system 206 of FIG. 2) and may be represented by one or more multiple computer-executable media files. The samples may be from the same comic book or graphic novel or from different comic books or graphic novels, and may be from a same series of stories, from different series, or may not be part of a series. The samples may represent samples from a respective volume or issue of a comic book or graphic novel.

At block 504, the system may generate a first executable file (e.g., the displayable content file 112 of FIG. 1, the displayable content file 329 of FIG. 3A, the displayable content file 380 of FIG. 3B) that, when executed by a device (e.g., the one or more user devices 114 of FIG. 1, the one or more user devices 224 of FIG. 2, the user device 352 of FIG. 3B), causes display of the first and second content (in any order), along with other content aggregated in the executable file. The executable file, when selected and executed, may begin at a default page, such as a cover page, a table of contents indicating the samples included in the executable file and their respective pages, or may open to a cover image of a sample included in the executable file. The content of the executable file may be arranged on multiple digital pages, and a reader may open, select, scroll, turn, or otherwise navigate from one page to another page of the executable file when executed. The executable file may add first selectable actions to the first and second content to allow a user to indicate a preference or request for more or less content like the content in the executable file (e.g., the selectable indicator 124 of FIG. 1, the selectable indicator 126 of FIG. 1, the selectable indicator 134 of FIG. 1, the selectable indicator 136 of FIG. 1, the selectable indicator 330 of FIG. 3A, the selectable indicator 332 of FIG. 3A, the selectable indicator 334 of FIG. 3A, the selectable indicator 336 of FIG. 3A, the selectable indicator 388 of FIG. 3B, the selectable indicator 389 of FIG. 3B, the selectable indicator 395 of FIG. 3B, the selectable indicator 396 of FIG. 3B).

At block 506, the system may send the first executable file (e.g., to a user device or an application, such as a web browser or mobile application executable at a user device to cause display of the executable file). The system may provide the file to a web server or device from where the executable file may be accessed. The system may receive one or more application programming interface (API) calls for content, and the system may respond by sending the executable file through an API or other interface. The first executable file may include the selectable actions, or the selectable actions may be transmitted separately by the system. The selectable actions may be presented within the executable file when executed, or may be presented separately from the samples in the executable file.

At block 508, the system may identify (e.g., from selection data) one or more actions associated with the first executable file or actions taken by a user, such as page views, purchases, recommendations, and/or product reviews. When the executable file is executed and content is displayed at a device, code on the executable file may cause presentation of selectable actions that, when selected, cause the device displaying the content of the executable file to send selection data to the system. The selection data may identify the first file, the content associated with a selectable action, the selectable actions and their locations (e.g., in the content presented when the file is executed). The selectable actions may be displayed separately from the samples of the executable file (e.g., a like and/or dislike indicator), and when selected, the one or more actions may be received with location data (e.g., used with metadata to identify which panel was presented when the action was performed), or with data indicating the one or more panels presented at the time of the performed action. The system may identify consumer data (e.g., as stored in the database 250 of FIG. 2) that indicates popular content, user preferences, award data for given content, and the like.

At block 510, the system may determine, based on the actions, metadata, and/or consumer data, one or more reader preferences associated with the first content and the second content of the first executable file. For example, the system may determine that a reader has read one panel, group of panels, or story of a series (e.g., sample 1 of a series with multiple stories), as the system may receive selections of selectable indicators and/or may receive data (e.g., selection data) indicative that a reader has browsed sample 1, read sample 1, purchased sample 1, and the like, and the system may use series logic to determine that the reader has a preference for other samples of the same series. The system may include one or more subsequent sample in a series in one or more subsequent displayable content files. The system may use browsing and/or purchase history to determine other series that a reader may be interested in given a reader's interest in a series. For example, the system may determine that readers of series X may have purchased or subscribed to series Y, so when a reader indicates a preference for series X (e.g., from having read series X or providing a selection of a selectable indicator (e.g., selectable action) indicating a preference for more content similar to or included in series X), the system may determine that series X readers have also indicated a preference for series Y, and may provide stories (e.g., samples) of series Y in one or more subsequent displayable content files for a reader.

At block 512, the system may generate a second executable file based on the one or more reader preferences. The second executable file may include content (e.g., third and fourth content) identified based on the user preferences determined by the system using the selection data, metadata, and/or consumer data. The executable file, when selected and executed, may begin at a default page, such as a cover page, a table of contents indicating the samples included in the executable file and their respective pages, or may open to a cover image of a sample included in the executable file. The content of the executable file may be arranged on multiple digital pages, and a reader may open, select, scroll, turn, or otherwise navigate from one page to another page of the executable file when executed. The executable file may add selectable actions to the third and fourth content to allow a user to indicate a preference or request for more or less content like the content in the executable file (e.g., the selectable indicator 124 of FIG. 1, the selectable indicator 126 of FIG. 1, the selectable indicator 134 of FIG. 1, the selectable indicator 136 of FIG. 1, the selectable indicator 330 of FIG. 3A, the selectable indicator 332 of FIG. 3A, the selectable indicator 334 of FIG. 3A, the selectable indicator 336 of FIG. 3A, the selectable indicator 388 of FIG. 3B, the selectable indicator 389 of FIG. 3B, the selectable indicator 395 of FIG. 3B, the selectable indicator 396 of FIG. 3B).

At block 514, the system may send the second executable file (e.g., to a user device or an application, such as a web browser or mobile application executable at a user device to cause display of the executable file). The system may provide the file to a web server or device from where the executable file may be accessed. The system may receive one or more application programming interface (API) calls for content, and the system may respond by sending the executable file through an API or other interface.

The embodiments described above are examples and are not meant to be limiting.

Figure 6:
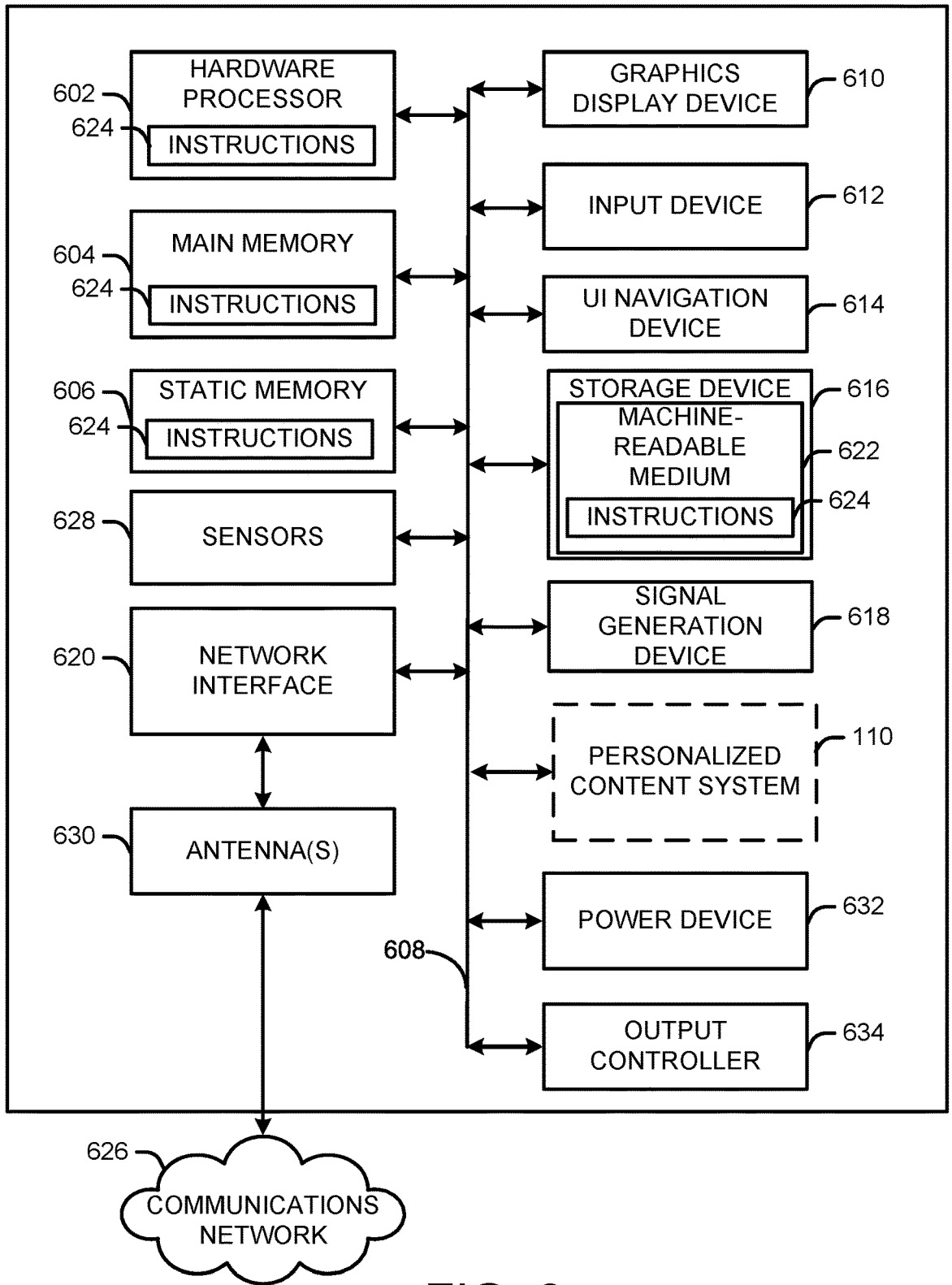
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the one or more content publisher systems 102 of FIG. 1, the personalized content system 110 of FIG. 1, the one or more user devices 114 of FIG. 1, the one or more content publisher systems 202 of FIG. 2, the content system 212 of FIG. 2, the remote network 210 of FIG. 2, the one or more user devices 224 of FIG. 3, the user device 352 of FIG. 3B) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard, touch pad, buttons), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, the personalized content system 110 of FIG. 1, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a display, stereo receiver, media device, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The personalized content system 110 may carry out or perform any of the operations and processes (e.g., process 400 of FIG. 4A, process 450 of FIG. 4B, process 500 of FIG. 5) described and shown above.

In one or more embodiments, the personalized content system 110 may select content samples for a particular user. In this manner, one user device for a first user may receive a Manga Zasshi issue with different samples of content (e.g., different stories from different comic books and/or graphic novels) than another user device may receive for a second user. Content selection criteria may include a number of people who read a sample and then bought the corresponding comic book or graphic novel volume, a user's or user device's browsing or page history (e.g., including an analysis of which volumes were browsed, but not purchased, by the user), series logic (e.g., if the user read and/or bought part one of a series with multiple parts, the user may be interested in other parts of the same series), a determination of which content was read and/or bought by customers who read and/or bought the same content as a given user, user actions (e.g., whether the user opened the file for given content, whether the user performed an end action, such as providing a product review, selecting an indicator (e.g., a selectable action) indicating that the user read and/or enjoyed the content, etc.), and other criteria. A user may opt into a series, and when new content for the series is available, the user's device may download the content and/or a system may generate an email or other type of message with a link to the newly available content.

In one or more embodiments, to determine which content in a file with aggregated content from multiple stories was read by a user, the personalized content system 110 may consider metrics based on user activity with a device. For example, the personalized content system 110 may determine whether a user clicked on a link in a table of contents, the link referring to a particular sample (e.g., indicating that the user wanted to read the sample). The content may have actions, such as selectable indicators (e.g., "more like this," "less like this," "purchase," "add to cart," etc.) that, when selected, result in communication of selection data indicating that the selectable indicator (or selectable action) was selected, a location (e.g., a page of a book presented by a content file) where a selectable action was presented, a metric indicating a selectable action such as an indication that the user enjoyed the content, did not enjoy the content, purchased the content, which panel or panels the user read and/or liked or disliked, etc. When content is read using a web browser, the individual stories may be individual files. Thus, when a user reads one sample or a portion of a sample, a device may determine that the specific file for the sample was executed. The personalized content system 110 may determine which files were executed by a user, and may determine whether the files are related to a particular publisher, series, or other similar content (e.g., based on metadata for the files indicating content categories, target readers, which content that other readers of the file read, the location of content samples in a content file, the location of a selectable action in a content file, the content represented by image data and/or text data of one or more panels of a sample, etc.).

In one or more embodiments, the personalized content system 110 may receive content from multiple publishers and may stitch together the content in a single file for a user. The personalized content system 110 may map each portion of content (e.g., each comic book and/or graphic novel sample) to a larger content unit (e.g., the specific story, author, publisher, etc.) and to a metric after a panel or digital page on which the portion of content is presented. For example, content from one comic book or graphic novel may occupy the first five pages of readable content on a device. After the final panel for the comic book, a selectable indicator may be presented, allowing the user to indicate whether the user wants more or less of the content from the same story, series, publisher, author, etc. Alternatively, each page may present a single panel and a selectable action, or each page may present a single panel while a selectable action is presented concurrently to allow a reader to provide an indication of whether the reader likes or dislikes something about the panel displayed.

In one or more embodiments, the personalized content system 110 may map the specific panels and/or pages (or other indexed locations) of content for a story to the larger story, to a series, to an author and/or publisher, and the like so that the system may determine whether the user read and enjoyed the specific story, series, publisher, author, etc. for the purposes of customizing the next issue of aggregated content for the user. In particular, a Manga Zasshi may include a file with panels from multiple comic books and/or graphic novels, and the file may have metadata indicating which panels and/or digital pages correspond to a story, series, author, publisher, and the like. In this manner, the personalized content system 110 may monitor a reader's interaction with individual content samples in a file which includes multiple content samples from different sources. When a user selects a "more like this" end action indicator, the system may trigger an action to identify content having the same or similar category (e.g., action, adventure, comedy, romance, etc.), the same or similar target reader demographics, the same or similar series, the same author and/or publisher, or other criteria as the content sample that was read. For example, when the user reads volume I of Series X and selects "more like this," the personalized content system 110 may identify from the metadata that the selection of the "more like this" indicator refers to the reader preferring more content from Series X, more content from other series similar to Series X, and the like.

In one or more embodiments, the personalized content system 110 may use machine learning to identify content of interest for a user. The machine learning may be trained with data such as popular content for all users, popular content for respective user demographics, signals generated from end actions (e.g., selections of "more like this," "less like this," "buy the next X portions of this series," etc.). The criteria used to determine similar content that a user may enjoy based on previously read content and user actions may be adjusted using machine learning so that the most relevant content for a user is presented in a Zasshi or other aggregated content.

In one or more embodiments, aggregated content may be personalized using P13N personalization. P13N personalization may replace or supplement a "recommended for you" category or other similar category presented on a device application or interface. The signals generated based on user actions (e.g., indications that a user read a portion of content, has indicated a preference for more of the same content, has purchased the content, etc.) may be P13N signals that provide indications of a user's content preferences. The personalized content system 110 may map the signals to related content to be evaluated for inclusion in a subsequent file with aggregated portions of content from different comic book and/or graphic novel stories.

In one or more embodiments, the personalized content system 110 may generate presentable content files that include content from multiple sources (e.g., different content publishers). The content may include multiple comic book and/or graphic novel stories (e.g., volumes from different content series). A story may include a combination of images and text, which may be stored on one or more files. To generate a presentable content file with multiple aggregated stories, the personalized content system 110 may combine data from story files into one file, and may add content such as selectable indicators. For example, the personalized content system 110 may add selectable graphics, icons, buttons, or other items/objects that, when selected by a reader, indicate a preference for or against the content in the presentable content file. The selectable content may be in the form of selectable indicators of a user's preference, such as a selectable button or icon that is displayed with a graphic and/or text reading "Subscribe to this series," "Subscribe to this Publisher," "More Content like this," "Less Content like this," "Buy the next X Volumes of this Story," and the like. The personalized content system 110 may receive reader selections of the selectable indicators. To determine the content to which a selectable indicator corresponds (e.g., which content of the multiple stories the user requested more or less of), the personalized content system 110 may maintain metadata or other data for respective presentable content files. For example, the metadata may indicate which stories are presented on which digital pages of a presentable content file, which panels (e.g., images) are presented on which digital pages of the presentable content file, which selectable indicators are presented on which digital pages (and at which locations) of a presentable content file, and the like. In this manner, when the personalized content system 110 receives selections of selectable indicators from a device, the personalized content system 110 may identify the specific presentable content file, which selectable indicator was selected, and to which story or series the selectable indicator corresponds. Using the selections, the personalized content system 110 may determine user preferences for or against certain content, and may use those preferences to identify content to include or not include in subsequent presentable content files for user or device.

It is understood that the above are only a subset of what the personalized content system 110 may be configured to perform and that other functions included throughout this disclosure may also be performed by the personalized content system 110.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

Figure 7:
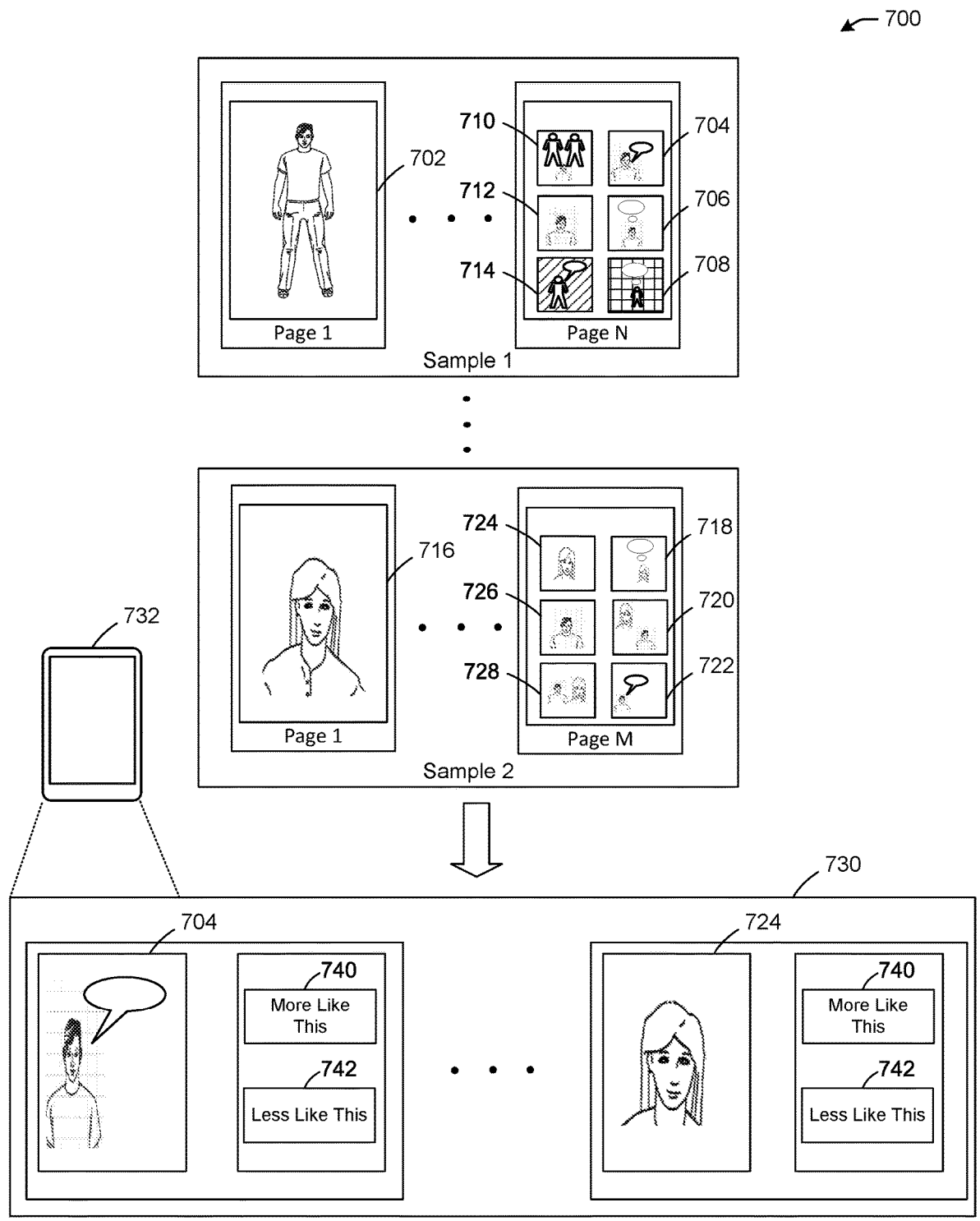
FIG. 7 illustrates a process for automated personalized Zasshi, in accordance with one or more example embodiments of the present disclosure.

FIG. 7 illustrates a process 700 for automated personalized Zasshi, in accordance with one or more example embodiments of the present disclosure.

Referring to FIG. 7, the process 700 may include aggregating sample 1 and sample 2, each which may be represented by one or multiple computer-executable files and may represent all or a portion of different comic books, graphic novels, or different volumes or issues of a comic book or graphic novel. Sample 1 may include pages 1-N, with a cover image 702 being presented on page 1. The cover image 702 may include a title, author, publisher, volume, issue, and/or series, although not shown in FIG. 7. Pages 1-N of the sample 1 may include panels, which may include drawings, text, and/or graphics used to present the sample 1. For example, a page (e.g., page N) may include panel 704, panel 706, panel 708, panel 710, panel 712, and panel 714, or any number of panels included in the sample 1. Sample 2 may include pages 1-M, beginning with a cover image 716 on page M, and including multiple panels on pages 1-M. For example, page M may include panel 718, panel 720, panel 722, panel 724, panel 726, and panel 728, or any number of panels of the sample 2.

Still referring to FIG. 7, the sample 1 and the sample 2 may be aggregated (e.g., by the personalized content system 110 of FIG. 1, the content system 212 of FIG. 2) to generate a display 730 at a user device 732. For example, the user device 732 may receive an executable file (not shown in FIG. 7) with content aggregated from sample 1 and sample 2. The file, when executed at the user device 732, may cause presentation of individual panels and/or cover images of sample 1 and sample 2 in the display 730. As shown, one page of display may include the panel 704, and another page of display may include the panel 724 (e.g., the user device 732 may scroll through individual panels as respective pages). While any respective panel is presented, one or more selectable actions may be presented concurrently, either within the same display window (e.g., on a same page) as the respective panel or in a separate display window (e.g., shown separately from a page displaying an individual panel). For example, a selectable action 740 may include text or graphics such as "More like this," a thumbs up, a "like," or some other indicator that the reader likes the content displayed when the reader selects the selectable action 740. A selectable action 742 may include text or graphics such as "Less like this," a thumbs down, a "dislike," or some other indicator that the reader dislikes the content displayed when the reader selects the selectable action 742. In this manner, the selectable action 740 and/or the selectable action 742 may not specifically correspond to a particular panel, sample, or page/location within a file, and may be presented with any panel or group of panels so that a reader may select the selectable action 740 and/or the selectable action 742 at any time during a display of any one or more panels.

In one or more embodiments, an executable file may include computer code that, when the file is executed at the user device 732, causes presentation of the panels and/or cover images of the sample 1 and the sample 2 in some order. The code, when executed, may cause presentation of the selectable action 740 and/or the selectable action 742, either within the same display window as a respective panel as if on a same page as the panel, or in a different display window as if separate from a page displaying the panel.

In one or more embodiments, the user device 732 may present the selectable action 740 and/or the selectable action 742 based on code received separately from the samples included in another file.

In one or more embodiments, when the selectable action 740 and/or the selectable action 742 is selected, because the selectable action 740 and/or the selectable action 742 may not correspond to a particular panel (e.g., selectable action 740 and/or the selectable action 742 may be displayed when any panel is displayed), selection data (e.g., the selection data 223 of FIG. 2, the one or more selections 376 of FIG. 3) may include an indication of the specific panel or panel being presented at the time when the selectable action 740 and/or the selectable action 742 was selected. Using this data, a content system (e.g., the personalized content system 110 of FIG. 1, the content system 212 of FIG. 2) may determine that the selectable action 740 and/or the selectable action 742 (e.g., the selection data) may correspond to a particular panel, sample, story, series, chapter, volume, issue, or the like. The system (not shown in FIG. 7) may analyze the image data and/or text data of the panel that was displayed, and may determine additional content to display or recommend to a reader based on the selection of the selectable action 740 and/or the selectable action 742.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    determining first content associated with a first book, wherein the first content comprises first image data and first text data;
    determining second content associated with a second book, wherein the second content comprises second image data and second text data;
    determining a first computer-executable file including the first content and the second content;
    determining selectable actions associated with at least one of the first content or the second content;
    determining metadata associated with the first content, the second content, and the selectable actions;
    transmitting the first computer-executable file;
    receiving first selection data associated with the selectable actions;
    receiving second selection data associated with the selectable actions;
    determining, based on the metadata, that the first selection data is associated with the first content;
    determining, based on the metadata, that the second selection data is associated with the second content;
    determining, based on the metadata, the first book, and the second book, user preferences;
    determining, based on the user preferences, third content and fourth content;
    determining a second computer-executable file including the third content and the fourth content; and
    transmitting the second computer-executable file.

2. The method of claim 1, wherein the first selection data comprises an indicator associated with the first content, wherein the metadata comprises the indicator, and wherein determining that the first selection data is associated with the first content is further based on the indicator.

3. The method of claim 1, wherein the first selection data comprises location data associated with the first content, wherein the metadata comprises the location data, and wherein determining that the first selection data is associated with the first content is further based on the location data.

4. The method of claim 1, wherein the first content consists of a first image comprising the first image data and the first text data, wherein determining that the first selection data is associated with the first content comprises determining that the first selection data is associated with the first image, and wherein determining the third content comprises determining, based on at least one of the first image data or the first text data, the third content.

5. A method, comprising:
    generating a first computer-executable file including first content associated with a first book, and second content associated with a second book, wherein the first content comprises first image data and first text data, and wherein the second content comprises second image data and second text data;
    determining selectable actions associated with the first content and the second content;
    determining metadata associated with the first content, the second content, and the selectable actions;
    transmitting the first computer-executable file;
    receiving selection data associated with the selectable actions;
    determining, based on the metadata, that the selectable actions are associated with the first content and the second content;
    determining, based on the metadata, the first book, and the second book, user preferences; and
    determining, based on the user preferences, third content with which to generate a second computer-executable file.

6. The method of claim 5, wherein the first content consists of a first image comprising the first image data and the first text data, wherein determining that the selectable actions are associated with the first content and the second content comprises determining that a first selectable action of the selectable actions is associated with the first image, and wherein determining the third content comprises determining, based on at least one of the first image data or the first text data, the third content.

7. The method of claim 6, wherein a first story comprises the first image and a second image.

8. The method of claim 5, wherein the first content comprises a first image and a second image, wherein determining that the selectable actions are associated with the first content and the second content comprises determining that the selectable actions are associated with the first image and the second image, and wherein determining the third content comprises determining, based on at least one of the first image or the second image, the third content.

9. The method of claim 5, further comprising:
    determining a first type of content associated with the first image data;
    determining a second type of content associated with the first image data; and
    identifying the third content from a catalog, wherein the third content is associated with at least one of the first type of content or the second type of content, and wherein determining the third content is further based on identifying the third content from the catalog.

10. The method of claim 5, further comprising:
    determining a first type of content associated with the first text data;
    determining a second type of content associated with the first text data; and identifying the third content from a catalog, wherein the third content is associated with at least one of the first type of content or the second type of content, and wherein determining the third content is further based on identifying the third content from the catalog.

11. The method of claim 5, wherein a first story comprises a first number of images, wherein the user preferences are first user preferences, and wherein determining the first content comprises:
   determining second user preferences; and
   determining, based on the second user preferences, first images of the first content, wherein the first images comprise a subset of the first number of images, and wherein the first images comprise the first image data.

12. The method of claim 5, wherein the third content is associated with a third book, wherein the third book is different than the first book and the second book.

13. The method of claim 5, wherein the third content is associated with the first book.

14. The method of claim 5, wherein the selection data is first selection data, and wherein the selectable actions are a first selectable action, further comprising:
   receiving second selection data associated with second selectable actions; and
   determining, based on the metadata, that the second selectable actions are action is associated with the first content and the second content, wherein determining the third content is further based on the second selectable actions.

15. The method of claim 5, wherein the selection data is first selection data, and wherein the selectable actions are a first selectable action, further comprising:
   receiving second selection data associated with second selectable actions;
   determining, based on the metadata, that the second selectable actions are associated with the second content;
   determining, based on the second selectable actions, fourth content;
   determining a second computer-executable file including the third content and the fourth content; and
   transmitting the second computer-executable file.

16. The method of claim 5, wherein determining the third content further comprises determining that the selectable actions are associated with a first content series, wherein determining the third content is further based on the first content series.

17. The method of claim 5, wherein determining the third content comprises determining, based on the selectable actions, an amount of content, further comprising determining a second computer-executable file comprising the third content, wherein determining the third content is based on the amount of content.

18. The method of claim 5, further comprising determining, based on the selectable actions, a content publisher associated with the first content, wherein determining the third content is further based on the content publisher.

19. The method of claim 5, wherein determining the first content comprises:
   determining data indicative of a number of readers who consumed the first content and purchased additional content; and
   determining that the number of readers exceeds a threshold number of readers.

20. A system, comprising at least one processor coupled to memory, the at least one processor configured to:
   generate a first computer-executable file including first content associated with a first book, and second content associated with a second book, wherein the first content comprises first image data and first text data, and wherein the second content comprises second image data and second text data;
   determine selectable actions associated with the first content and the second content;
   determine metadata associated with the first content, the second content, and the selectable actions;
   transmit the first computer-executable file;
   receive selection data associated with the selectable actions;
   determine, based on the metadata, that the selectable actions are associated with the first content and the second content;
   determine, based on the metadata, the first book, and the second book, user preferences; and
   determine, based on the user preferences, third content with which to generate a second computer-executable file.

* * * * *